United States Patent
Shanbhogue et al.

(10) Patent No.: US 10,445,494 B2
(45) Date of Patent: Oct. 15, 2019

(54) ATTACK PROTECTION FOR VALID GADGET CONTROL TRANSFERS

(71) Applicant: Intel Corporation, Santa Clara, CA (US)

(72) Inventors: Vedvyas Shanbhogue, Austin, TX (US); Ravi L. Sahita, Portland, OR (US); Yuriy Bulygin, Beaverton, OR (US); Xiaoning Li, Santa Clara, CA (US); Jason W. Brandt, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/658,699

(22) Filed: Jul. 25, 2017

(65) Prior Publication Data
US 2017/0329961 A1 Nov. 16, 2017

Related U.S. Application Data

(62) Division of application No. 14/518,507, filed on Oct. 20, 2014, now Pat. No. 9,767,272.

(51) Int. Cl.
| | | |
|---|---|---|
| *G06F 21/00* | (2013.01) | |
| *G06F 21/52* | (2013.01) | |
| *G06F 9/30* | (2018.01) | |
| *G06F 9/38* | (2018.01) | |
| *G06F 9/448* | (2018.01) | |

(52) U.S. Cl.
CPC .......... *G06F 21/52* (2013.01); *G06F 9/30021* (2013.01); *G06F 9/30054* (2013.01); *G06F 9/30076* (2013.01); *G06F 9/30134* (2013.01); *G06F 9/3861* (2013.01); *G06F 9/4484* (2018.02)

(58) Field of Classification Search
CPC ....................................................... G06F 21/52
See application file for complete search history.

(56) References Cited

U.S. PATENT DOCUMENTS

| | | |
|---|---|---|
| 4,783,747 A | 11/1988 | Komori |
| 5,826,055 A | 10/1998 | Wang et al. |
| (Continued) | | |

FOREIGN PATENT DOCUMENTS

| | | |
|---|---|---|
| EP | 2867843 | 5/2015 |
| WO | 2014005067 | 1/2014 |
| WO | 2014023894 | 2/2014 |

OTHER PUBLICATIONS

Cowan et al., StackGuard: Simple Stack Smash Protection for GCC, 2003, GCC Developers Summit (Year: 2003).*

(Continued)

*Primary Examiner* — John B King
(74) *Attorney, Agent, or Firm* — Trop, Pruner & Hu, P.C.

(57) ABSTRACT

In one embodiment, a processor comprises: a first register to store a first bound value for a stack to be stored in a memory; a second register to store a second bound value for the stack; a checker logic to determine, prior to an exit point at a conclusion of a function to be executed on the processor, whether a value of a stack pointer is within a range between the first bound value and the second bound value; and a logic to prevent a return to a caller of the function if the stack pointer value is not within the range. Other embodiments are described and claimed.

17 Claims, 15 Drawing Sheets

(56) References Cited

U.S. PATENT DOCUMENTS

| | | | | |
|---|---|---|---|---|
| 6,550,058 | B1* | 4/2003 | Wynn | G06F 8/41 |
| | | | | 717/158 |
| 6,711,672 | B1* | 3/2004 | Agesen | G06F 8/52 |
| | | | | 712/227 |
| 6,983,364 | B2* | 1/2006 | Gougeon | G06Q 20/341 |
| | | | | 713/165 |
| 6,993,663 | B1 | 1/2006 | Paya | |
| 6,996,677 | B2 | 2/2006 | Lee et al. | |
| 7,272,748 | B1* | 9/2007 | Conover | G06F 11/1407 |
| | | | | 712/233 |
| 7,581,089 | B1 | 8/2009 | White | |
| 7,987,451 | B1 | 7/2011 | Dalcher et al. | |
| 8,209,757 | B1 | 6/2012 | Kennedy | |
| 8,434,073 | B1 | 4/2013 | Satish | |
| 8,468,600 | B1 | 6/2013 | Kaskel | |
| 8,555,077 | B2 | 10/2013 | Davis et al. | |
| 8,613,084 | B2 | 12/2013 | Dalcher | |
| 8,688,980 | B2 | 4/2014 | Davis et al. | |
| 8,689,350 | B2 | 4/2014 | Davis et al. | |
| 8,713,704 | B2 | 4/2014 | Davis et al. | |
| 8,813,085 | B2 | 8/2014 | Glew et al. | |
| 8,869,241 | B2 | 10/2014 | Davis et al. | |
| 8,930,714 | B2 | 1/2015 | Glew et al. | |
| 8,943,313 | B2 | 1/2015 | Glew et al. | |
| 8,943,592 | B1 | 1/2015 | Mirski | |
| 8,955,111 | B2 | 2/2015 | Glew et al. | |
| 9,015,860 | B2 | 4/2015 | Davis et al. | |
| 9,083,687 | B2 | 7/2015 | Davis et al. | |
| 9,098,608 | B2 | 8/2015 | Glew et al. | |
| 9,170,843 | B2 | 10/2015 | Glew et al. | |
| 9,298,900 | B2 | 3/2016 | Davis et al. | |
| 9,348,985 | B2 | 5/2016 | Davis et al. | |
| 9,443,085 | B2 | 9/2016 | Glew et al. | |
| 2001/0052053 | A1* | 12/2001 | Nemirovsky | G06F 9/546 |
| | | | | 711/138 |
| 2002/0144141 | A1 | 10/2002 | Edwards | |
| 2003/0097587 | A1 | 5/2003 | Gulick | |
| 2003/0217277 | A1* | 11/2003 | Narayanan | G06F 11/2284 |
| | | | | 713/187 |
| 2004/0133777 | A1* | 7/2004 | Kiriansky | G06F 21/53 |
| | | | | 713/166 |
| 2007/0136565 | A1 | 6/2007 | Lambrache et al. | |
| 2008/0060077 | A1* | 3/2008 | Cowan | G06F 12/1408 |
| | | | | 726/25 |
| 2008/0209406 | A1 | 8/2008 | O'Callahan | |
| 2009/0077544 | A1 | 3/2009 | Wu | |
| 2009/0172332 | A1 | 7/2009 | Ono et al. | |
| 2010/0174893 | A1 | 7/2010 | Rivera | |
| 2012/0167120 | A1 | 6/2012 | Hentunen | |
| 2013/0024676 | A1 | 1/2013 | Glew et al. | |
| 2013/0024867 | A1 | 1/2013 | Glew et al. | |
| 2013/0024939 | A1 | 1/2013 | Glew et al. | |
| 2013/0036314 | A1 | 2/2013 | Glew et al. | |
| 2013/0036464 | A1 | 2/2013 | Glew et al. | |
| 2013/0081043 | A1 | 3/2013 | Glew et al. | |
| 2013/0133054 | A1 | 5/2013 | Davis et al. | |
| 2013/0151515 | A1 | 6/2013 | Davis et al. | |
| 2013/0151617 | A1 | 6/2013 | Davis et al. | |
| 2013/0159217 | A1 | 6/2013 | Davis et al. | |
| 2013/0159413 | A1 | 6/2013 | Davis et al. | |
| 2013/0160087 | A1 | 6/2013 | Davis et al. | |
| 2013/0160121 | A1 | 6/2013 | Yazdani | |
| 2013/0191887 | A1 | 7/2013 | Davis et al. | |
| 2013/0197968 | A1 | 8/2013 | Davis et al. | |
| 2013/0298231 | A1* | 11/2013 | Jiang | H04L 63/08 |
| | | | | 726/22 |
| 2014/0123249 | A1 | 5/2014 | Davis et al. | |
| 2014/0156972 | A1 | 6/2014 | Shanbhogue | |
| 2014/0173290 | A1* | 6/2014 | Kaplan | G06F 21/52 |
| | | | | 713/189 |
| 2014/0173293 | A1* | 6/2014 | Kaplan | G06F 21/54 |
| | | | | 713/190 |
| 2014/0181972 | A1 | 6/2014 | Karta | |
| 2014/0298038 | A1* | 10/2014 | Gauravaram | H04L 9/0643 |
| | | | | 713/189 |
| 2014/0365742 | A1 | 12/2014 | Patel | |
| 2014/0380468 | A1 | 12/2014 | Gerzon | |
| 2015/0020075 | A1 | 1/2015 | Glew et al. | |
| 2015/0020198 | A1 | 1/2015 | Mirski | |
| 2015/0067763 | A1 | 3/2015 | Dalcher | |
| 2015/0128262 | A1 | 5/2015 | Glew et al. | |
| 2015/0278116 | A1 | 10/2015 | Caprioli | |
| 2016/0021134 | A1 | 1/2016 | Li | |
| 2016/0094552 | A1 | 3/2016 | Durham | |
| 2016/0170769 | A1* | 6/2016 | LeMay | G06F 9/3863 |
| | | | | 713/190 |
| 2017/0046280 | A1* | 2/2017 | Driessen | G06F 12/1408 |
| 2018/0089427 | A1* | 3/2018 | Branco | H04L 9/14 |

OTHER PUBLICATIONS

Kayaalp et al., Branch Regulation: Low-Overhead Protection from Code Reuse Attacks, 2012, 39th Annual International Symposium on Computer Architecture (ISCA) (Year: 2012).*

International Searching Authority, "Notification of Transmittal of the International Search Report and the Written Opinion of the International Searching Authority," dated Dec. 4, 2015 in International application No. PCT/US2015/047128.

U.S. Appl. No. 14/518,483, filed Oct. 20, 2014, entitled "Providing Supervisor Control of Control Transfer Execution Profiling," by Ravi L. Sahita, et al.

PCT Application Serial No. PCT/US13/57064, filed Aug. 28, 2013, entitled "Hardware and Software Execution Profiling," by Intel Corporation.

Dino A. Dai Zovi, "Practical Return Oriented Programming," Apr. 2010, 68 pages.

U.S. Appl. No. 14/039,663, filed Sep. 27, 2013, entitled "Using Software Having Control Transfer Termination Instructions With Software Not Having Control Transfer Termination Instructions," by Vedvyas Shanbhogue, et al.

European Patent Office, Extended European Search Report dated Apr. 19, 2018 in European Patent Application No. 15853035.2.

China National Intellectual Property Administration, First Office Action dated Jan. 2, 2019 in Chinese patent Application No. 201580050696.1.

European Patent Office, Communication pursuant to Article 94(3) EPC, dated Jan. 21, 2019 in European Patent Application No. 15853035.2.

* cited by examiner

400

ATTACK PROTECTION FOR VALID GADGET CONTROL TRANSFERS

This application is a divisional of U.S. patent application Ser. No. 14/518,507, filed Oct. 20, 2014, the content of which is hereby incorporated by reference.

TECHNICAL FIELD

Embodiments relate to providing protection against malware or other computer system security attacks.

BACKGROUND

Return-oriented programming (ROP) is a computer security exploit technique in which an attacker uses software control of a stack to execute an attacker-chosen sequence of machine instructions. These clusters of instructions typically end with a programmer-intended or unintended return (RET) instruction within existing program code. The intended or unintended RET instruction transfers execution to the attacker-chosen return address on the stack and allows the attacker to retain execution control through the program code, and direct execution to the next set of chosen sequence of instructions to achieve the attacker's intent. The clusters of attacker-chosen instruction sequences are referred to as gadgets.

Often the executed gadget includes only several assembler instructions followed by a RET instruction that can already perform a well-defined attack operation. By chaining together a set of these gadgets such that the RET instructions from one gadget lands into the next gadget and so on, the malware writer is able to execute a complex algorithm without injecting any code into the program. Some of these instruction sequences ending in a RET can be found in functions compiled into the program or libraries.

Thus the ROP technique involves delivering a payload having a set of chained list of pointers to gadgets and parameters to a data memory of a program using vulnerabilities like stack buffer overflows. The exploit also overwrites the return address of the vulnerable function that was used to perform the stack buffer overflow to point to the first gadget in the sequence. When this vulnerable function executes a RET instruction, control transfers to the first gadget instead of the function caller. This gadget may then consume one or more data elements from the stack payload. Using this exploit type, the malware writer is able to change the control flow of the program by causing a control transfer to a non-programmer intended location in the program (e.g., to the middle of an instruction).

A ROP attack technique uses various characteristics of an x86 instruction set architecture (ISA): variable length and unaligned instruction encoding; large and dense ISA encoding; a stack holding control and data information; and a single byte opcode RET instruction. Current techniques to defend against such attacks may be ineffective and have various shortcomings.

DETAILED DESCRIPTION

Figure 1:
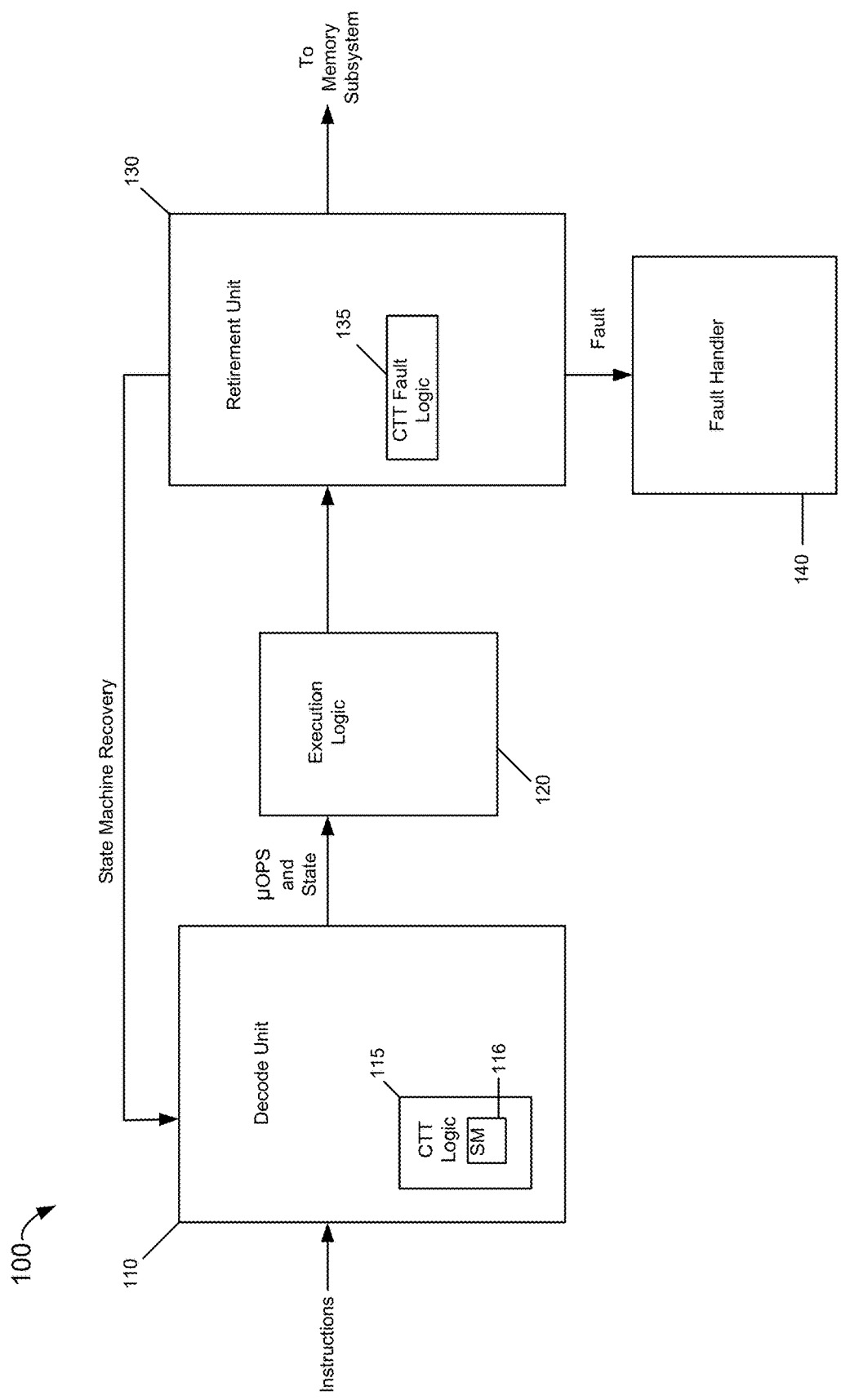
FIG. 1 is a block diagram of a portion of a processor in accordance with an embodiment of the present invention.

Embodiments provide a set of instruction set architecture (ISA) instructions that enable a processor to determine whether a control transfer instruction is directed to an appropriate target, and if not to take action to prevent instructions beyond the control transfer instruction from being committed to the architectural state of the processor. In this way, at least certain unintended control transfers within a program can be eliminated, constraining the number of gadgets that a malware writer can use. In addition, embodiments provide additional techniques to further constrain the ability to chain together gadgets in an undesired manner.

More specifically, embodiments provide a set of control transfer termination (CTT) instructions to allow software to specify valid control transfer terminating points in a program such that hardware can enforce control transfers to occur to only programmer-intended locations. These CTT instructions perform this enforcement with minimal performance and energy impacts to the program. The CTT ISA extensions can thus mitigate the execution of unintended gadgets in programs.

As more computer systems are used in Internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the ISA may be implemented by one or more micro-architectures, which include processor logic and circuits used to implement one or more instruction sets. Accordingly, processors with different micro-architectures can share at least a portion of a common instruction set. For example, Intel® Pentium 4 processors, Intel® Core™ and Intel® Atom™ processors from Intel Corp. of Santa Clara, Calif., and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a register alias table (RAT), a reorder buffer (ROB) and a retirement register file). In one embodiment, registers may include one or more registers, register architectures, register files, or other register sets that may or may not be addressable by a software programmer.

In one embodiment, an instruction may include one or more instruction formats. Such instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

A first CTT instruction, referred to herein as an ENDBRANCH instruction, is used to identify valid locations in a program where a control transfer may be validly performed using an indirect CALL or an indirect jump (JMP) instruction. A second CTT instruction, referred to herein as an ENDRET instruction, is used to identify valid locations in a program where a control transfer may be validly performed using a RET instruction.

In an embodiment, these instructions have the following characteristics: they are 4 byte opcodes chosen such that they do not naturally occur in programs; and they are defined as no operation (NOP) currently in the x86 ISA to allow programs compiled with ENDBRANCH/ENDRET instructions to execute on earlier generation processors.

Although the scope of the present invention is not limited in this regard in an embodiment, these CTT instructions may have a general form that includes a multi-byte opcode. In one such implementation these CTT instructions may be represented by a four-byte opcode that corresponds to an opcode value not presently existing in the current x86 ISA. Beyond this opcode, there may be no additional encoding for the instruction, since the instruction executes as a no operation within an execution logic. As such there is no identification of a source operand, destination operand or immediate value to be associated with the instruction.

Referring now to FIG. 1, shown is a block diagram of a portion of a processor in accordance with an embodiment of the present invention. As shown in FIG. 1, portion 100 of the processor includes various portions of a pipelined processor such as an in-order or out-of-order processor. As seen, incoming instructions which may be macro-instructions of a given ISA are provided to a decode unit 110 that is configured to decode the instructions, e.g., into one or more smaller instruction such as micro-operations (μops).

As seen, decode unit 110 includes a CTT logic 115 in accordance with an embodiment of the present invention. In general, CTT logic 115 may analyze each incoming instruction and determine whether the instruction is associated with a control transfer. If so, CTT logic 115 may associate certain state information with one or more μops. This state indicates a state of a state machine 116 that is modified by decoding of at least certain control transfer and control transfer termination instructions. If instead the instruction is not associated with a control transfer, a different state may be associated with the one or more μops.

More specifically, when an incoming instruction is a control transfer instruction, a transition of state machine 116 within CTT logic 115 may occur to pass from an idle state to a given wait state. Furthermore, to reflect this wait state, a given encoding can be associated with the one or more μops decoded from the incoming control transfer instruction. If a next incoming instruction is a control transfer termination instruction that immediately follows the control transfer termination, then state machine 116 may return to the idle state and associate a given encoding with the decoded one or more μops. As will be discussed, if a control transfer instruction is not immediately followed by a control transfer termination instruction, CTT logic 115 may insert a fault μop into the processor pipeline (and the state machine may remain in a wait state).

Otherwise, if state machine 116 is in an idle state and an incoming instruction does not relate to a control transfer (or termination), an encoding of idle state information may be associated with the one or more μops to indicate that state machine 116 remains in the idle state.

Thus as seen in FIG. 1, decode unit 110 outputs a stream of μops and associated state information to indicate a state of state machine 116 within CTT logic 115. These μops and state information may be provided to an execution logic 120, which can include various types of units including arithmetic logic units (ALUs), floating point units and so forth that thus execute operations indicated by the stream of μops. In an embodiment, the CTT instructions only control the state transitions in state machine 200, and in an execution logic of the processor these instructions execute as NOP and do not cause any change in the program semantics.

In turn, results of the μops are provided to a retirement unit 130 configured to determine whether given operations were successfully performed and to retire them if so, and otherwise to raise a fault or exception if an undesired condition occurs as a result of the execution. In an out-of-order processor, retirement unit 130 may further operate to reorder instructions which may be executed in any order, back into program order. When instructions properly retire, they may be provided to further portions of a processor such as a memory sub system.

As further seen in FIG. 1, retirement unit 130 includes a CTT fault logic 135 which may be configured to determine whether appropriate behavior occurs with regard to control transfer instructions. More specifically, CTT fault logic 135 may operate to raise a fault when a given control transfer instruction to be retired is not directly followed by an appropriate control transfer termination instruction, as described herein. In an embodiment, this determination may be based at least in part on an inserted fault μop and the state information communicated with the μops exiting from decode unit 110. If a CTT fault μop is detected, a fault is raised and is communicated to a fault handler 140, which may take various actions in accordance with a given handler to resolve the faulting behavior. Thus in an embodiment, when a next instruction presented to retire after a control transfer instruction is not an appropriate CTT instruction, retirement unit 140 may deliver a fault responsive to this CTT fault μop by delivering a fault-class exception (e.g., a general protection fault) such that that instruction does not retire.

Still referring to FIG. 1, in the case where a misprediction occurs and instructions are to be re-executed according to a correct branch, retirement unit 130 may communicate via a feedback path with decode unit 110 to thus provide an indication of a proper branch or other code flow to be taken. Still further, via this feedback path a state machine recovery signal can be communicated such that state machine 116 of CTT logic 115 can be placed into an appropriate state to reflect this change in program flow. Stated another way, when a fault μop is present in a mispredicted path, a fault is not raised due to this misprediction and accordingly the state machine recovery signal may cause state machine 116 to pass from a wait state back to an idle state or a wait state, and to also indicate the last successful instruction to retire, so that decode unit 110 can decode instructions of the correct branch. Although shown at this high level in the embodiment of FIG. 1, understand the scope of the present invention is not limited in this regard.

Figure 2:
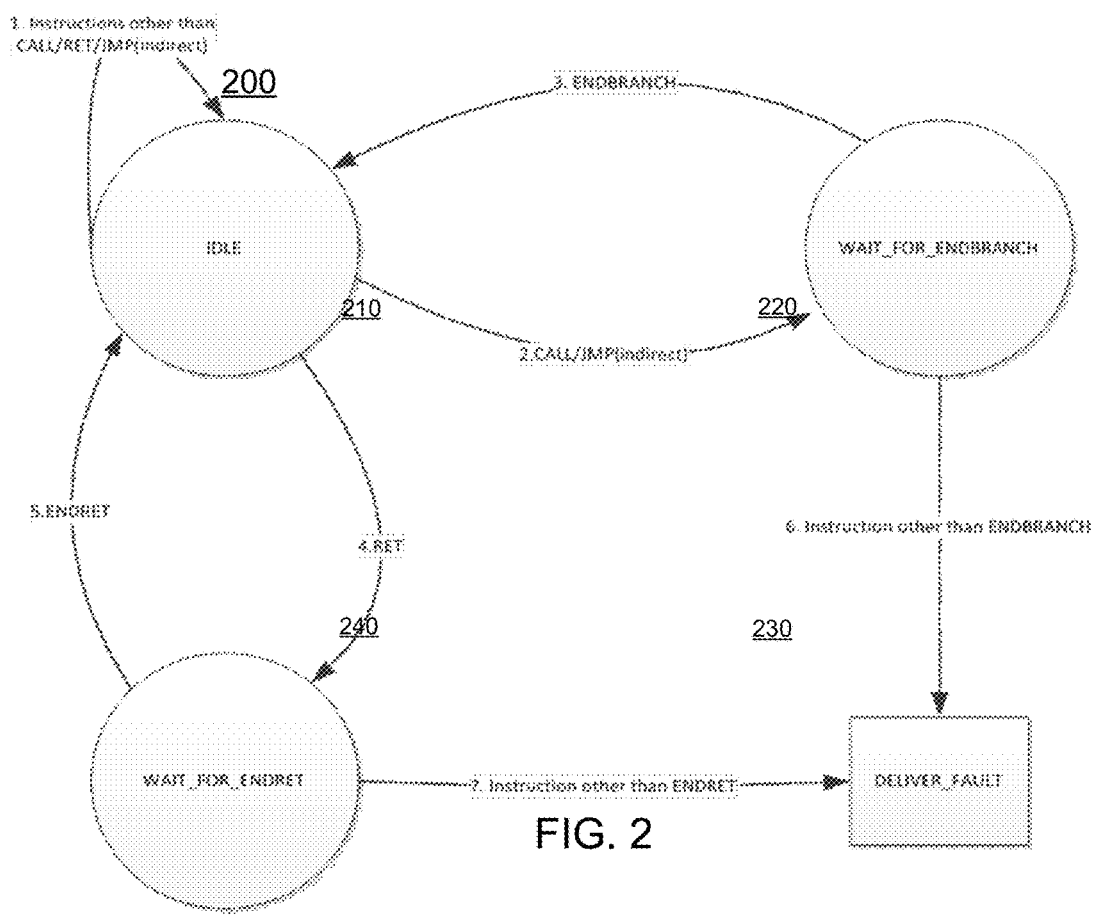
FIG. 2 is a block diagram of a state machine in accordance with an embodiment of the present invention.

Referring now to FIG. 2, shown is a block diagram of a state machine in accordance with an embodiment of the present invention. As shown in FIG. 2, state machine 200 may correspond to CTT state machine 116 of FIG. 1. State machine 200 begins operation in an IDLE state 210 into which the state machine is placed after reset of a processor.

When an indirect CALL or JMP instruction is decoded, the state machine enters the WAIT_FOR_ENDBRANCH state 220. If the next instruction that is decoded is not an ENDBRANCH instruction, then state machine 200 performs a DELIVER_FAULT operation 230 which causes generation of a fault μop (and state machine 200 may remain in the WAIT_FOR_ENDBRANCH state 220). If instead the next instruction to be decoded following a control transfer instruction is an ENDBRANCH instruction, state machine 200 transitions back to the IDLE state 210.

When a RET instruction is decoded, state machine 200 enters the WAIT_FOR_ENDRET state 240. If the next instruction that is decoded is not an ENDRET instruction, state machine 200 performs the DELIVER_FAULT operation 230. If the next instruction that is decoded is an ENDRET instruction, state machine 200 transitions back to the IDLE state 210.

Interrupts/exceptions/traps and VM exits that occur when state machine 200 is in the WAIT_FOR_ENDBRANCH or WAIT_FOR_ENDRET states cause a transition of the state machine to the IDLE state instead of the DELIVER_FAULT state (not shown for ease of illustration in FIG. 2). This is so, as the fault delivered due to the target of the indirect CALL, JMP or RET is higher priority than any faults caused by the target instruction itself (e.g., #NM, #GP due to various conditions like alignment checks, canonical checks, etc.) or any VM exits caused due to the target instruction being a VM exiting instruction (e.g., exiting on XGETBV, CPUID, etc.). This operation ensures that these asynchronous events do not cause unintended exceptions. Because these events are asynchronous to normal program execution, an attacker cannot realistically force them to be delivered after the CALL, JMP or RET, and thus they are not an effective way for an attacker to bypass the ROP security.

Enabling CTT additionally has the following effects, in an embodiment: interrupt returns (IRET) are disallowed and undefined (#UD) in a user level (e.g., ring 3) to prevent their use for building ROP gadgets; a pop to flags register instruction (POPF) does not update the trap flag (TF) bit in the system flags when executed at ring 3, which prevents an attacker from causing a #DB deterministically by using a POPFs instructions RET gadget, because exception will transition the state machine to the IDLE state.

State machine 200 thus enforces the following rules: the instruction at the target of a RET instruction must be an ENDRET instruction and the instruction at the target of an indirect CALL or indirect JMP instruction must be an ENDBRANCH instruction. If these rules are violated, then the violating instruction (the instruction at the target of a RET or CALL/JMP instructions) faults and is prevented from retiring.

Thus by placing ENDBRANCH and ENDRET instructions in a program at valid control transfer locations, a programmer or compiler can prevent unintended control transfers from happening. This placement of ENDBRANCH and ENDRET instructions is as illustrated below in Table 1, as an example:

TABLE 1

```
main( ) {
    int (*f)( );
    f = foo;
    f( );
}
int foo( ) {
    return
}
0000000000400513 <main>:
endbranch
push      %rbp
mov       %rsp,%rbp
sub       $0x10, %rsp
movq      $0x4004fb, -8(%rbp)
mov       -8(%rbp), %rdx
mov       $0x0, %eax
call      *%rdx
endret
leaveq
retq
00000000004004fb <foo>:
endbranch
push      %rbp
mov       %rsp,%rbp
leaveq
retq
```

In this example, an ENDBRANCH instruction is placed as the first instruction in the subroutine foo and in the main program. And an ENDRET instruction is placed after the CALL instruction to subroutine foo. Thus there are now 3 valid control transfer points in this program. Specifically, in execution of the main program, a call instruction (call *% rdx) is executed, causing a control transfer to the subroutine foo. More specifically as seen, the first instruction in this subroutine is an ENDBRANCH instruction, such that a valid control transfer occurs and the CTT state machine thus proceeds from an IDLE state, to a WAIT_FOR_ENDBRANCH state and back to the IDLE state, without raising a fault.

Similarly, at the conclusion of the subroutine foo, a return instruction (RETQ) is executed, thus causing control to transfer to the first instruction after the calling instruction in the main program. Here, this instruction is an ENDRET instruction and as such, a valid control transfer occurs. In this case, the CTT state machine proceeds from the IDLE state, to the WAIT_FOR_ENDRET state, and thereafter back to the IDLE state, without raising a fault.

Thus using CTT in accordance with an embodiment of the present invention, a constraint is introduced that a ROP gadget be preceded with an ENDRET to be usable. As such, a significant reduction in the number of gadgets that can be harvested from a library is realized, and the quality of such gadgets is significantly lower in terms of functionality that these remaining gadgets expose, making ROP attacks harder to execute.

Figure 3A:
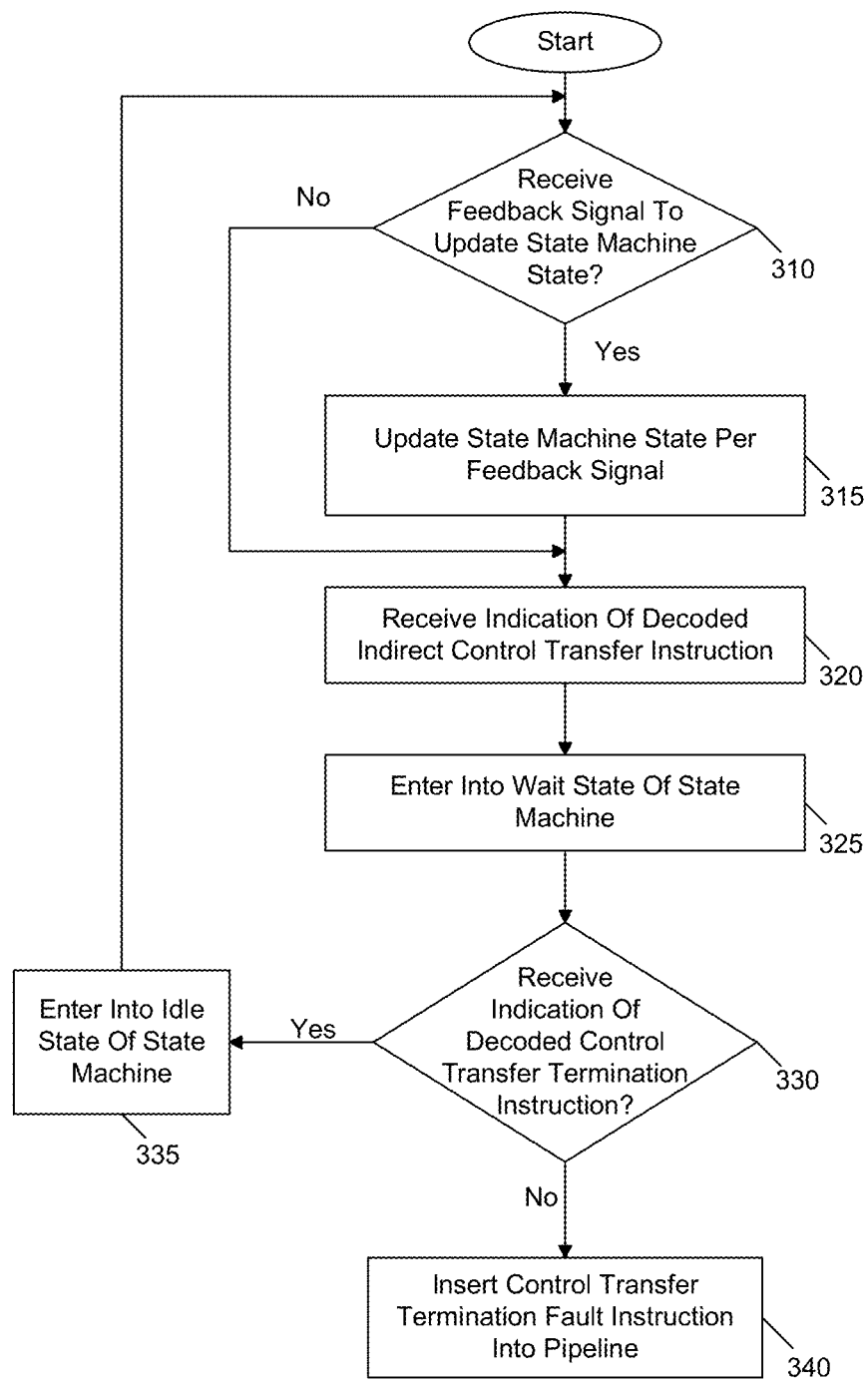
FIG. 3A is a flow diagram of a method in accordance with an embodiment of the present invention.

Referring now to FIG. 3A, shown is a flow diagram of a method in accordance with an embodiment of the present invention. As shown, method 300 may be performed by front end logic including a CTT state machine as described herein. Note that the operations shown in FIG. 3A relate to state machine operations for control transfer-related instructions. For other instructions, if the state machine is currently in the idle state, it remains there. As seen, method 300 begins by determining whether a feedback signal is received to update the CTT state machine (diamond 310). In an embodiment, this feedback signal may be received from a retirement unit or fault handler to cause the state of the state machine to transition to a given state, e.g., due to a misprediction (as from a retirement unit) or responsive to resolving a fault (as from a fault handler). If such feedback signal was received, control passes to block 315 where the state machine is updated with the state communicated through this feedback signal.

From both of these cases, control passes next to block 320 where an indication that an indirect control transfer instruction such as a call, jump or return has occurred (assuming that the decode unit has decoded such an instruction). And as such, control passes to block 325 where a transition into a wait sate of the state machine may occur.

Still referring to FIG. 3A, control next passes to diamond 330 where it can be determined whether an indication of receipt of a control transfer termination instruction is received. If so, control passes to block 335 where the idle state of the state machine be entered, as pursuant to this proper CTT instruction following the control transfer instruction a valid control transfer occurs.

If instead it is determined that next decoded instruction is not a control transfer termination instruction, control passes to block 340 where a control transfer termination fault instruction can be inserted into the processor pipeline. Note here that the state of the state machine does not change and thus remains in the selected wait state. In an embodiment, this fault instruction is a μop that travels through the processor pipeline and if it is selected for retirement, the retirement unit will cause a fault to enable an OS-based fault handler to execute to determine the cause of the fault and take appropriate action.

Figure 3B:
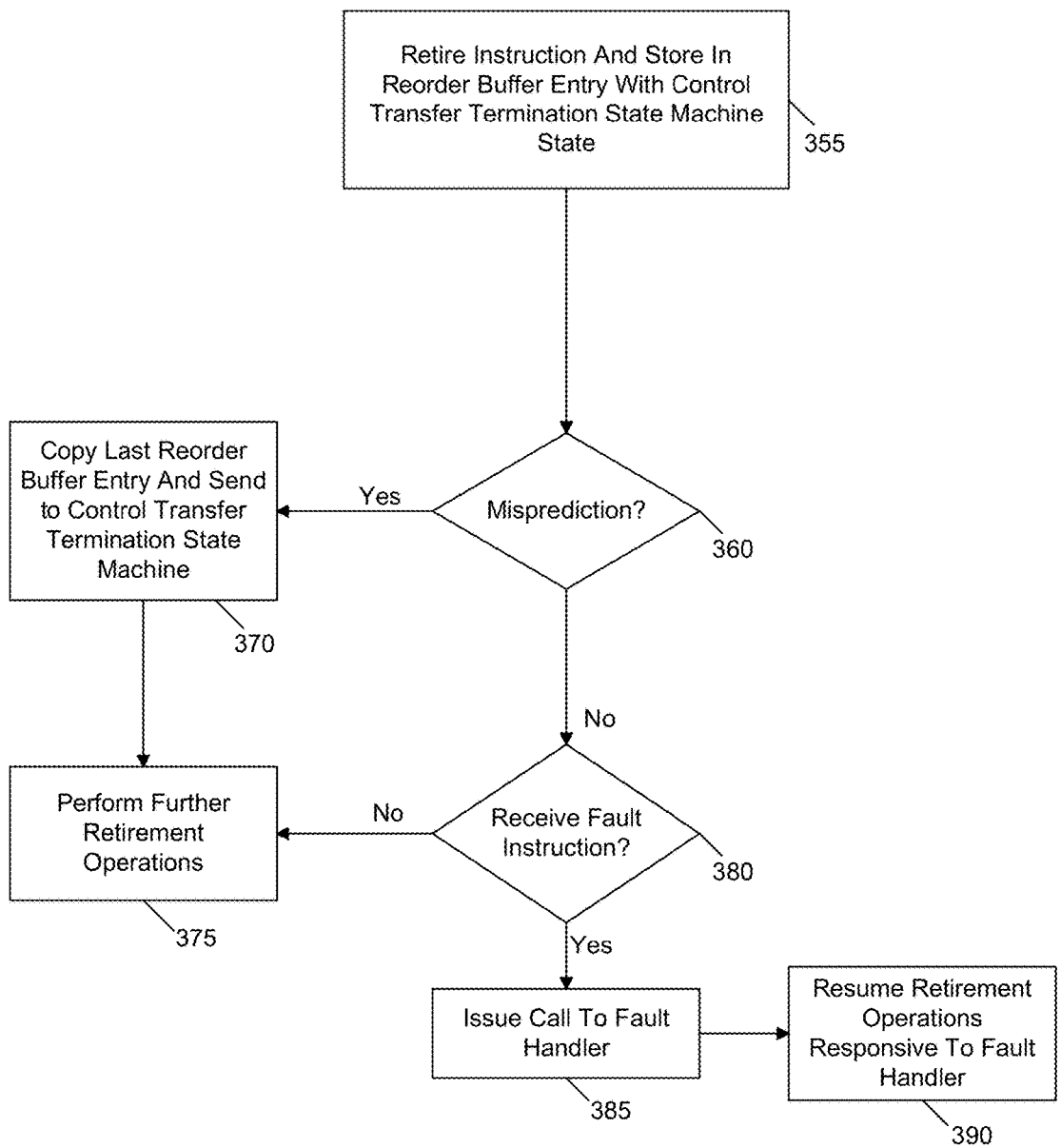
FIG. 3B is a flow diagram of another method in accordance with an embodiment of the present invention.

FIG. 3B is a flow diagram of another method in accordance with an embodiment of the present invention. Method 350 may be performed at least in part by logic of a retirement unit to handle CTT-based retirement operations. As seen, method 350 begins by retiring a given instruction and storing CTT state associated with the instruction (block 355). In an embodiment, this information may be stored in a given storage of the retirement unit such as reorder buffer entry. As will be discussed further below, this state can be used in case a misprediction occurs. Next control passes to diamond 360 to determine whether a misprediction has occurred. If so, control passes to block 370 where information regarding the last validly retired instruction present in an entry of the reorder buffer can be obtained and sent back to CTT logic (of the decode unit) to enable updating the state of the state machine into the appropriate state. There further typical retirement operations may continue (at block 375).

Referring still to FIG. 3B, if a fault instruction is received (diamond 380), control passes to block 385 where a call can be issued to a fault handler. As an example, an OS-based fault handler may be executed. As part of this fault handling when the fault is due to a CTT fault μop, a supervisor-based CTT state machine may be enabled and used to access the state of the user mode CTT state machine to determine the reason for fault and to act accordingly. As an example, a target instruction (namely a non-CTT target instruction) may be prevented from retiring and an appropriate correction mechanism may be performed. Or the fault handler may take any other action. As part of such operations, the fault handler may cause the user mode CTT state machine to be set to the appropriate state.

As further shown in FIG. 3B, after completion of the fault handler, retirement operations can be resumed responsive to control of the fault handler (block 390). Although shown at this high level in the embodiment of FIG. 3B is to be understood that the scope of the present invention is not limited in this regard.

With CTT instructions enforcing valid control transfer locations, software checks can be placed after these instructions to further check for valid control transfers using techniques like stack canaries. For the example discussed above, reference is made to Table 2:

TABLE 2

```
main( ) {
    foo( );
    endret;
    <detour/hook to anti-malware code to perform branch sanity check>
    ...
}
int foo( ) {
    return
}
```

In the example above there is thus one place in the program (after the ENDRET) where such a check is to be placed. Without CTT, software cannot effectively check all places that can be used as gadgets as these gadgets can be crafted out of byte sequences in the middle of valid instructions.

The instrumentation of a program using CTT instructions may be performed by a compiler. In an embodiment, a just-in-time (JIT) compiler may perform the instrumentation of the CTT instructions. Alternately such instrumentation can be performed by rewriting the program binary to insert the CTT instructions using a binary rewriting tool that reconstructs the control flow graph from the application binary. The binary rewriting technique can be used in cases where the source of the binary is not available for recompilation. Such binary rewriting may also be done by anti-malware software using such tools.

In some cases, applications and libraries compiled with CTT instrumentation may be merged with libraries that are not compiled with CTT instrumentation, such non-CTT instrumented libraries referred to herein as "legacy libraries."

To support interworking with these legacy libraries, embodiments may provide additional instructions. In one such embodiment, a suppression instruction, referred to herein as a DISCTT instruction, is used to suppress the CTT state machine such that it stays in the IDLE state instead of transitioning to the WAIT_FOR_ENDBRANCH or WAIT_FOR_ENDRET states on an indirect CALL/JMP or RET, respectively. Additionally this instruction returns into a general purpose register the state of the CTT suppression at the time the instruction was issued. An enable instruction, referred to herein as an ENCTT instruction, is used to remove the suppression of the CTT state machine put in place by the DISCTT instruction such that the state machine enforces the CTT rules. Additionally this instruction returns the state of the CTT suppression at the time the instruction was issued.

The use of DISCTT and ENCTT instructions may be enabled for a process by an operating system. If the operating system does not allow a program to disable CTT, then the DISCTT instruction executes as a NOP and does not suppress CTT.

The use of the DISCTT and ENCTT instructions in a program to perform legacy interworking is illustrated below in Table 3:

TABLE 3

```
// Issue a DISCTT before invoking a legacy library function foo( )
temp_variable = DISCTT;
foo( );
// If CTT was suppressed by DISCTT prior to this legacy library
call then un-suppress it
IF (temp_variable == NOT_SUPPRESSED)
    ENCTT;
ENDIF
```

Returning the previous state of CTT as a result of the DISCTT instruction allows for supporting call chains like below:

CTT_function1->legacy_function1->CTT_function-2->legacy_function2

Here the CTT_function1 issues a DISCTT instruction before calling the legacy_function1. The DISCTT instruction returns the current state of CTT functionality as NOT_SUPPRESSED and then suppresses the CTT functionality. The legacy_function1 calls the CTT_function2. Now when the CTT_function2 calls legacy_function2, it again issues a DISCTT instruction. The DISCTT instruction now returns the current state of the CTT functionality as SUPPRESSED since it has been suppressed by CTT_function1. When the control returns from legacy_function2 to CTT_function2, it does not un-suppress the CTT functionality since it was already suppressed when it was invoked. When the control returns to CTT_function1, it un-suppresses the CTT functionality using the ENCTT instruction since it was suppressed by that function.

Returning the previous state of CTT responsive to the ENCTT instruction allows for a CTT-enabled library function to be called by a non-CTT enabled library/application to un-suppress CTT before it starts executing and suppress CTT before returning to the caller, if it was suppressed when the function was called.

This is as illustrated below in Table 4:

TABLE 4

```
Legacy_function1( )
{
    CTT_function1( );
}
CTT_function1( )
{
    //ENDBRANCH is a NOP if this function was called with CTT
    suppressed/disabled ENDBRANCH;
    // Un-suppress CTT. If already unsuppressed this is gratuitous
    temp_variable = ENCTT;
    ....
    ....
    ....
    // If CTT was suppressed when this function was called the suppress
    // it before returning
```

TABLE 4-continued

```
    IF ( temp_variable == SUPPRESSED )
        DISCTT;
    ENDIF
    RET;
}
```

Figure 4:
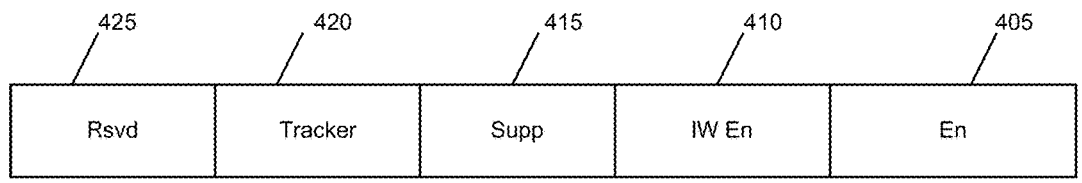
FIG. 4 is a block diagram of a configuration register in accordance with an embodiment of the present invention.

Referring now to FIG. 4, shown is a block diagram of a configuration register to store CTT state in accordance with an embodiment of the present invention. As shown in FIG. 4, configuration register 400 may include various fields to store state values used in performing CTT functionality. In an embodiment, two such configuration registers may be provided, with each register associated with a particular mode of operation. Stated another way, one configuration register may be used to control CTT operation in a user mode (e.g., ring 3) while a second configuration register may be used to control CTT functionality in a supervisor mode (e.g., rings less than 3).

In the embodiment shown, configuration register 400 includes an enable field 405 to store an enable indicator to indicate whether CTT is enabled for the current privilege level. A legacy enable field 410 is used to store an indicator to indicate whether legacy interworking is enabled. A suppression field 415 is used to store a suppression indicator to indicate whether CTT faults and tracking are to be suppressed. A tracker field 420 is used to store a value of the CTT state machine. In an embodiment, this tracker field may be two bits where a value of 0 indicates the IDLE state, a value of 1 indicates the WAIT_FOR_ENDRET state, and a value of 2 indicates the WAIT_FOR_ENDBRANCH state. A reserved field 425 may be used for various extensions. Of course other fields may be present in other embodiments.

Figure 5:
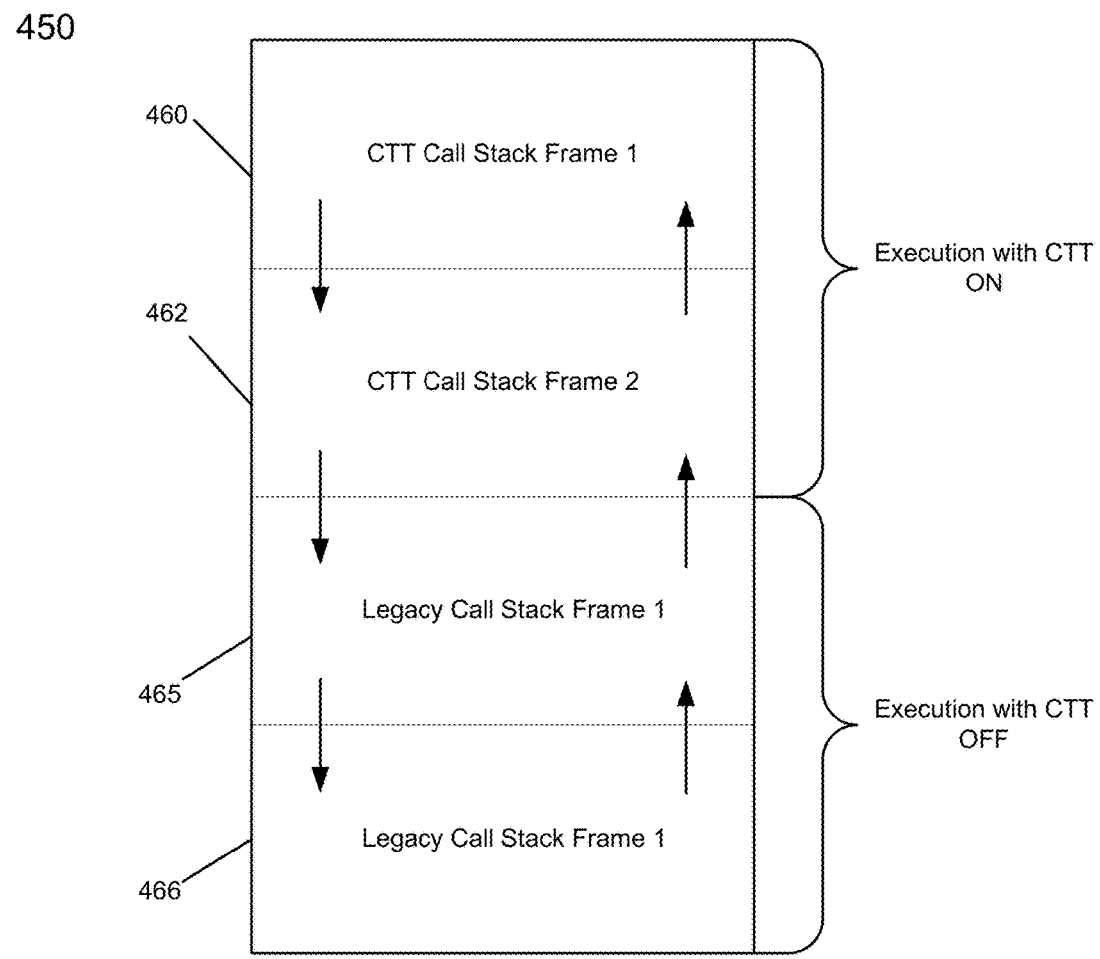
FIG. 5 is a block diagram of a call stack frame for code execution in accordance with an embodiment of the present invention.

Referring now to FIG. 5, shown is a block diagram of a call stack frame for code execution that interlaces CTT-enabled code and legacy code without CTT-enabled functionality. As shown in FIG. 5, a code segment 450 includes a first CTT call stack frame 460 and a second CTT call stack frame 462 that in turn calls a legacy call stack frame 465. Thus at the point of calling this legacy call stack frame, the CTT functionality is disabled responsive to a DISCTT instruction. Thus at this point execution begins with CTT functionality disabled for a first legacy call stack frame 465 and a second legacy call stack frame 466. Note that as the called functions return back, at the point of returning to call stack frame 462, execution with CTT functionality is re-enabled by an ENCTT instruction.

As such, FIG. 5 shows an example where a first transfer to legacy code suppresses CTT, which is done using indirect CALL/JMP instructions (not RET) for security reasons. Once CTT is suppressed by a DISCTT instruction, subsequent CALL/JMP/RET instructions can land on instructions other than ENDBRANCH/ENDRET without causing faults. CTT operation is unsuppressed when control returns to the point where suppression was done, via an ENCTT instruction.

Figure 6:
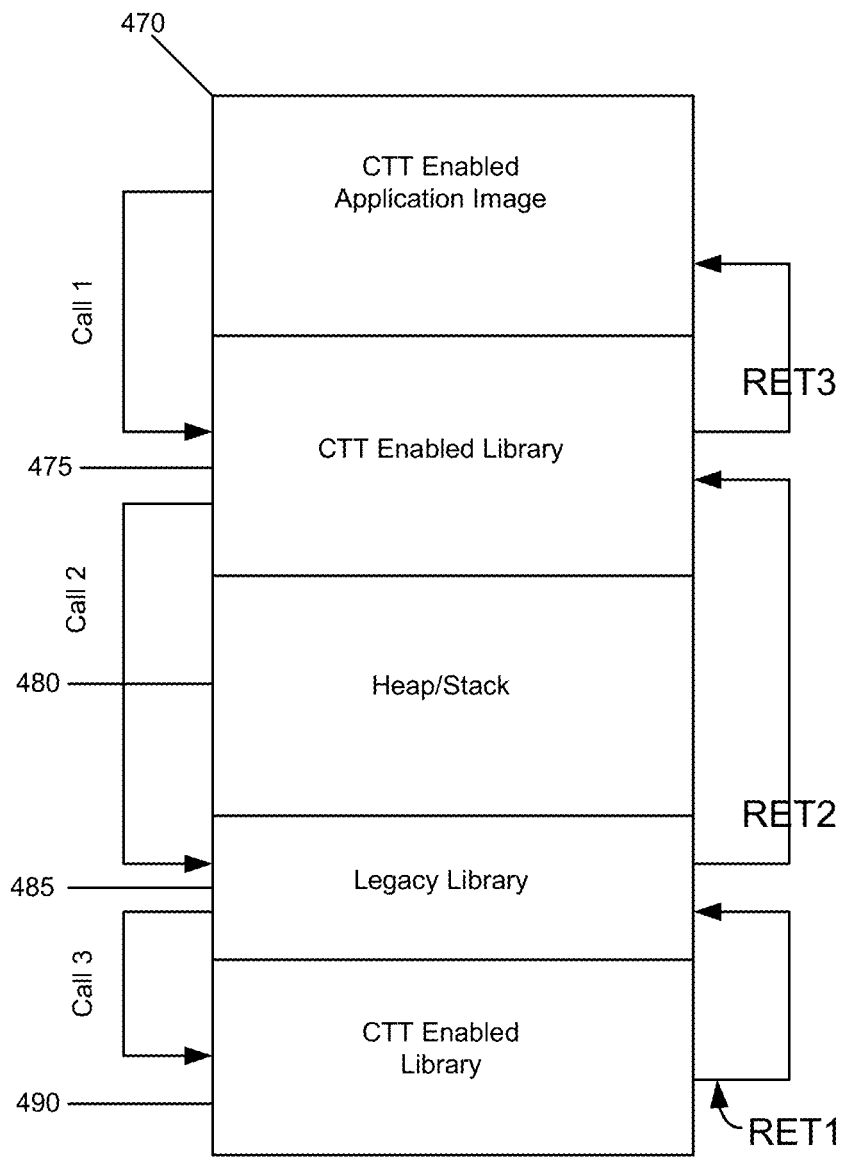
FIG. 6 is a block diagram of further details of legacy interworking in accordance with an embodiment of the present invention.

Referring now to FIG. 6, shown are further details of legacy interworking in accordance with an embodiment of the present invention. As shown in FIG. 6, an implementation is present with a CTT-enabled application image 470 that issues a call to a CTT enabled library 475 (Call1) that in turn initiates a call to a legacy library 485 (Call2). In turn, legacy library 485 issues a call to a second CTT-enabled library 490 (Call3). Also present is a heap/stack 480. After execution in second CTT-enabled library 490, control passes back to legacy library 485 (RET1), and from there control returns back to first CTT-enabled library 475 (RET2), and finally control returns back to application image 470 (RET3).

Note that upon Call2, a legacy transfer occurs and thus CTT is suppressed via a DISCTT instruction. Accordingly, for Call3, CTT remains suppressed, as it does for RET1. Finally, RET2 causes a return to the point of suppression and as such, CTT is unsuppressed via an ENCTT instruction. Note that this legacy interworking may be entered when a legacy interworking enable indicator of a CTT control logic is set and an indirect control transfer (namely a jump or call) occurs to a non-ENDBRANCH instruction.

The DISCTT and ENCTT instructions may be placed in the program by the programmer if she is aware of the interworking, and/or these DISCTT and ENCTT instructions may be placed in the program by the compiler/linker when it is linking statically to legacy libraries.

When linking dynamically to libraries, a loader or anti-malware software can insert trampoline functions between the application and the library, where the trampoline functions use DISCTT and ENCTT instructions. For example, calls to functions in a legacy library that are dynamically linked to a CTT enabled application go through a trampoline function, which suppresses CTT and then calls the legacy library function. The legacy library function returns to the trampoline function that un-suppresses CTT and returns to the CTT-enabled application.

Embodiments may be used by anti-malware software to wrap non-CTT binaries such that they can be used with CTT-enabled binaries. In addition, anti-malware software can restrict the use of the gadgets that can be found in the program even with CTT in use. Embodiments may be particularly applicable to mobile and other portable low power systems, in that software only techniques to mitigate against ROP (like rewriting binaries to remove all instances of RET by use of functionally equivalent but larger more complex sequences), generally lead to much larger binaries and increase the execution time of the program and thereby are not suited for mobile applications where power efficiency is a prime concern.

Figure 7:
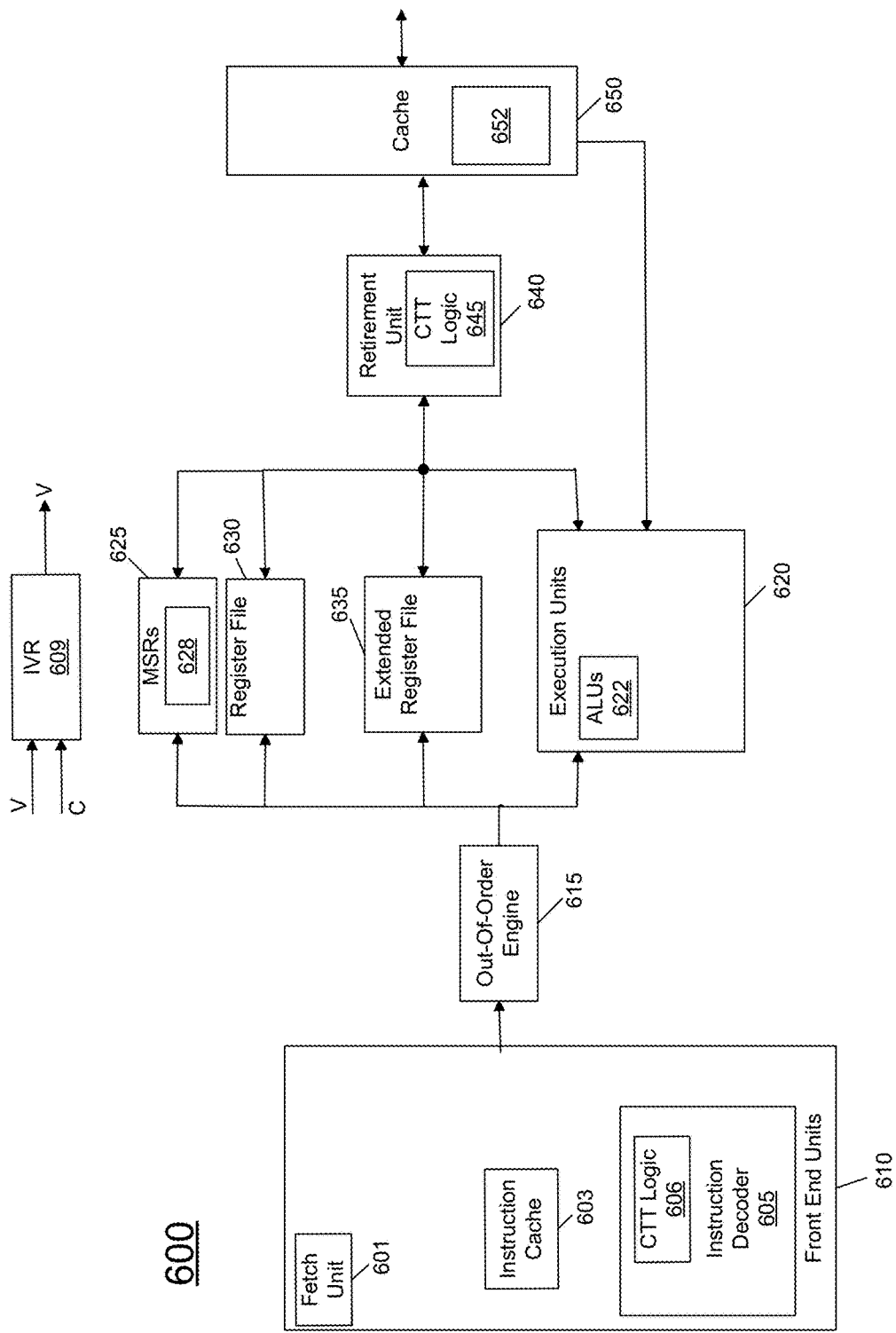
FIG. 7 is a block diagram of a processor core in accordance with one embodiment of the present invention.

Referring now to FIG. 7, shown is a block diagram of a processor core in accordance with one embodiment of the present invention. As shown in FIG. 7, processor core 600 may be a multi-stage pipelined out-of-order processor. Core 600 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.). It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

A processor including core 600 may be a general-purpose processor, such as a Core™ i3, i5, i7, 2 Duo and Quad, Xeon™, Itanium™, XScale™ or StrongARM™ processor, which are available from Intel Corporation. Alternatively, the processor may be from another company, such as a design from ARM Holdings, Ltd, MIPS, etc. The processor may be a special-purpose processor, such as, for example, a network or communication processor, compression engine, graphics processor, co-processor, embedded processor, or the like. The processor may be implemented on one or more chips, and may be a part of and/or may be implemented on one or more substrates using any of a number of process technologies, such as, for example, BiCMOS, CMOS, or NMOS.

As shown in FIG. 7, core 600 may operate at various voltages and frequencies as a result of integrated voltage regulator 609. As seen in FIG. 7, core 600 includes front end units 610, which may be used to fetch instructions to be executed and prepare them for use later in the processor. For example, front end units 610 may include a fetch unit 601, an instruction cache 603, and an instruction decoder 605. Instruction decoder 605 includes CTT logic 606 in accordance with an embodiment of the present invention, with an associated CTT state machine to perform CTT operations as described herein. In some implementations, front end units 610 may further include a trace cache, along with microcode storage as well as a micro-operation storage. Fetch unit 601 may fetch macro-instructions, e.g., from memory or instruction cache 603, and feed them to instruction decoder 605 to decode them into primitives, i.e., micro-operations for execution by the processor.

Coupled between front end units 610 and execution units 620 is an out-of-order (OOO) engine 615 that may be used to receive the micro-instructions and prepare them for execution. More specifically OOO engine 615 may include various buffers to re-order micro-instruction flow and allocate various resources needed for execution, as well as to provide renaming of logical registers onto storage locations within various register files such as machine-specific registers (MSRs) 625, register file 630 and extended register file 635. MSRs 625 may provide for storage of various configuration and control registers. In addition, MSRs 625 may include a set of bounds registers 628 to be used as discussed further below. Register file 630 may include separate register files for integer and floating point operations. Extended register file 635 may provide storage for vector-sized units, e.g., 256 or 512 bits per register.

Various resources may be present in execution units 620, including, for example, various integer, floating point, and single instruction multiple data (SIMD) logic units, among other specialized hardware. For example, such execution units may include one or more arithmetic logic units (ALUs) 622, among other such execution units such as a checker or comparison logic, to be used as described herein.

Results from the execution units may be provided to a retirement unit 640 including a reorder buffer (ROB). This ROB may include various arrays and logic to receive information associated with instructions that are executed. This information is then examined by retirement unit 640 to determine whether the instructions can be validly retired and result data committed to the architectural state of the processor, or whether one or more exceptions occurred that prevent a proper retirement of the instructions. Of course, retirement unit 640 may handle other operations associated with retirement. For retirement operations here, CTT logic 645 of the retirement unit may store CTT state machine state received with incoming instructions, and feedback this information responsive to a misprediction.

As shown in FIG. 7, retirement unit 640 is coupled to a cache 650 which in one embodiment may be a low level cache (e.g., an L1 cache), although the scope of the present invention is not limited in this regard. Also, execution units 620 can be directly coupled to cache 650. In the embodiment shown, a cache portion 652 may be allocated to store translated code portions instrumented with CTT instructions, as described further below. From cache 650, data communication may occur with higher level caches, system memory and so forth. While shown with this high level in the embodiment of FIG. 7, understand the scope of the present invention is not limited in this regard. For example, while the implementation of FIG. 7 is with regard to an out-of-order machine such as of an ISA, the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 8:
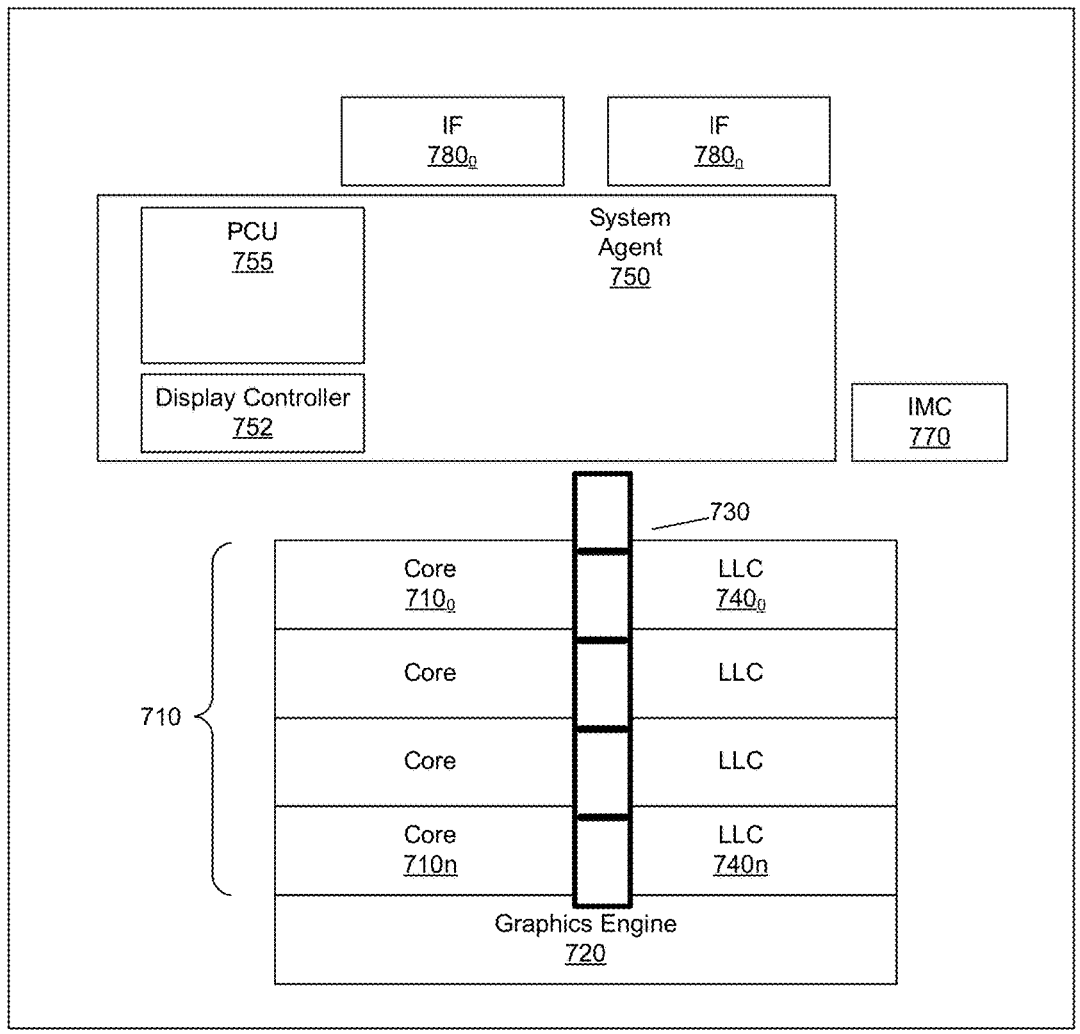
FIG. 8 is a block diagram of a multicore processor in accordance with an embodiment of the present invention.

Referring now to FIG. 8, shown is a block diagram of a multicore processor in accordance with an embodiment of the present invention. As shown in the embodiment of FIG. 8, processor 700 includes multiple domains. Specifically, a core domain 710 can include a plurality of cores 710$_0$-710$_n$, a graphics domain 720 can include one or more graphics engines, and a system agent domain 750 may further be present. In various embodiments, system agent domain 750 may handle power control events and power management such that individual units of domains 710 and 720 such as cores and/or graphics engines can be controlled to independently dynamically operate at an appropriate turbo mode frequency in light of the activity (or inactivity) occurring in the given unit. Each of domains 710 and 720 may operate at different voltage and/or power, and furthermore the individual units within the domains each may operate at an independent frequency and voltage. Note that while only shown with three domains, understand the scope of the present invention is not limited in this regard and additional domains can be present in other embodiments.

In general, each core 710 may further include low level caches in addition to various execution units and additional processing elements, including CTT logic as described herein. In turn, the various cores may be coupled to each other and to a shared cache memory formed of a plurality of units of a last level cache (LLC) 740$_0$-740$_n$. In various embodiments, LLC 740 may be shared amongst the cores and the graphics engine, as well as various media processing circuitry. As seen, a ring interconnect 730 thus couples the cores together, and provides interconnection between the cores, graphics domain 720 and system agent circuitry 750. In one embodiment, interconnect 730 can be part of the core domain. However in other embodiments the ring interconnect can be of its own domain.

As further seen, system agent domain 750 may include display controller 752 which may provide control of and an interface to an associated display. As further seen, system agent domain 750 may include a power control unit 755.

As further seen in FIG. 8, processor 700 can further include an integrated memory controller (IMC) 770 that can provide for an interface to a system memory, such as a dynamic random access memory (DRAM). Multiple interfaces 780$_0$-780$_n$ may be present to enable interconnection between the processor and other circuitry. For example, in one embodiment at least one direct media interface (DMI) interface may be provided as well as one or more Peripheral Component Interconnect Express (PCIe™) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 8, understand the scope of the present invention is not limited in this regard.

Note that when code includes CTT instructions as described herein, whether programmer included, compiler inserted or otherwise, there are still gadgets that remain in the code. These gadgets or code sequences start in an ENDRET instruction and end in a RET instruction. It is possible for an attacker such as malware to link these code sequences together to create a ROP chain. An example of such code sequence is shown below in Table 5.

TABLE 5

Function_foo:
...
...
Call bar
ENDRET
Call *(edx)
ENDRET
LEAVE
RET

In the function of Table 5, the sequence starting with the first ENDRET instruction can still be returned to without invoking the function_foo. Such gadgets that are prefixed with an ENDRET or an ENDBRANCH are called valid gadgets. Instrumenting code including this function with CTT instructions as above restricts the attacker to execute only valid instructions in the program and hence an attacker cannot do things like jump into the middle of the instructions. However they can still use a programmer-unintended RET to execute a valid gadget.

Embodiments provide further defenses via inclusion and execution of additional code provided in a program to prevent returning into the middle of a function without invoking the function from its beginning. As such, embodiments provide a set of defenses that can be employed in valid gadgets to prevent ROP-based attacks from chaining together valid gadgets. These defense schemes, along with appropriate CTT instruction inclusion and hardware enforcement, can be employed to harden the control flow integrity of a program.

While different sets of defenses are possible, in one embodiment examples include: use of interlock registers; use of hardened interlock registers via execute-only memory; use of a software managed shadow stack; and/or execution of stack pivot checks.

In general, embodiments may be used to detect invocation of valid gadgets within programs, which may be attacked by chaining two or more valid gadgets together to create a ROP chain. The techniques described herein may leverage the CTT instructions to detect when an attempt is made to return to an ENDRET instruction without invoking the encapsulating function, in an effort to invoke a valid gadget.

To perform defense against attacks using interlocks in registers, a set of operations may be performed on a set of one or more registers or memory to insert random values before function execution, and confirm whether these values still exist in the one or more registers/memory on function return.

Referring now to Table 6, shown is a code sequence to set up an interlock in a register (reg). In an embodiment, a compiler may insert this code sequence prior to a function call in code being instrumented.

TABLE 6

```
push <reg>
mov <function_specific_ID>, reg
call
endret
```

Here the register used (reg) is a callee-saved register, namely a register that the called function preserves. Note that in an embodiment, the compiler may select a different register for each instance of the call. Further understand that in embodiments the random number may be determined, e.g., by a dynamic loader, at the time of loading the code for this program such that the number is different each time the program is launched.

To determine whether the selected register still has the random value upon return from the function, the compiler may also emit the code sequence of Table 7 following an ENDRET instruction.

TABLE 7

```
Call
Endret
xor <function_specific_ID>, reg
jnz error
pop <reg>
```

Thus with this scheme in place an attacker that redirects control flow to the above ENDRET instruction will find a mismatch in the function_specifc_ID when compared to the register value selected by the compiler for this check. Responsive to this mismatch, the program may terminate (e.g., crash) and the attack is defeated. To bypass this check, an attacker would need to gather the function_specific_IDs used for all the valid gadgets to be chained together, in addition to a way to control the register content such that the correct register will include the correct function specific ID. As such, use of the above code can increase code protection.

In other cases, interlocks in registers can be hardened by maintaining code using the above technique in an execute-only (XO) memory. In this case, to protect the function_specific_ID from a memory read disclosure attack on code pages including such interlock code, the code pages on which the function_specific_IDs are used can be made to be execute-only, by controlling memory access attributes of such pages. In one such embodiment, a processor such as an Intel® processor including Intel® virtualization technology (VT) support can include management for execute-only permission, which can be applied via an extended page table (EPT) of a paging structure. In this case, a hypervisor or other supervisor manages the EPT as a second-level page table, while an OS manages a first-level page table, namely an OS-controlled page table. In this example, to seek access to code included in such protected memory pages, the processor performs a page table walk on both page tables in a nested manner. The resulting permissions obtained from the two tables may be logically AND'ed for a page mapped to both page table levels, translating from a guest virtual address to a guest physical address, and from the guest physical address to a host physical address.

Continuing with the above example, the code pages may be set to a read-execute (and may also be read-write-execute) permission in the OS-managed first level page table, but can be enforced as execute-only via permissions in the second level extended page table entry (EPTE) that maps to that code page, thus disallowing (and faulting on) any reads or writes targeting the code page from code running in a VMX-non-root mode (in the guest). Enforcing execute-only (XO) permission on these code pages disallows an attacker from gathering the function_specific_IDs to be able to chain gadgets together. Note that a similar extension for execute-only memory for this usage may be implemented via the OS-managed page tables in some processors.

Figure 9:
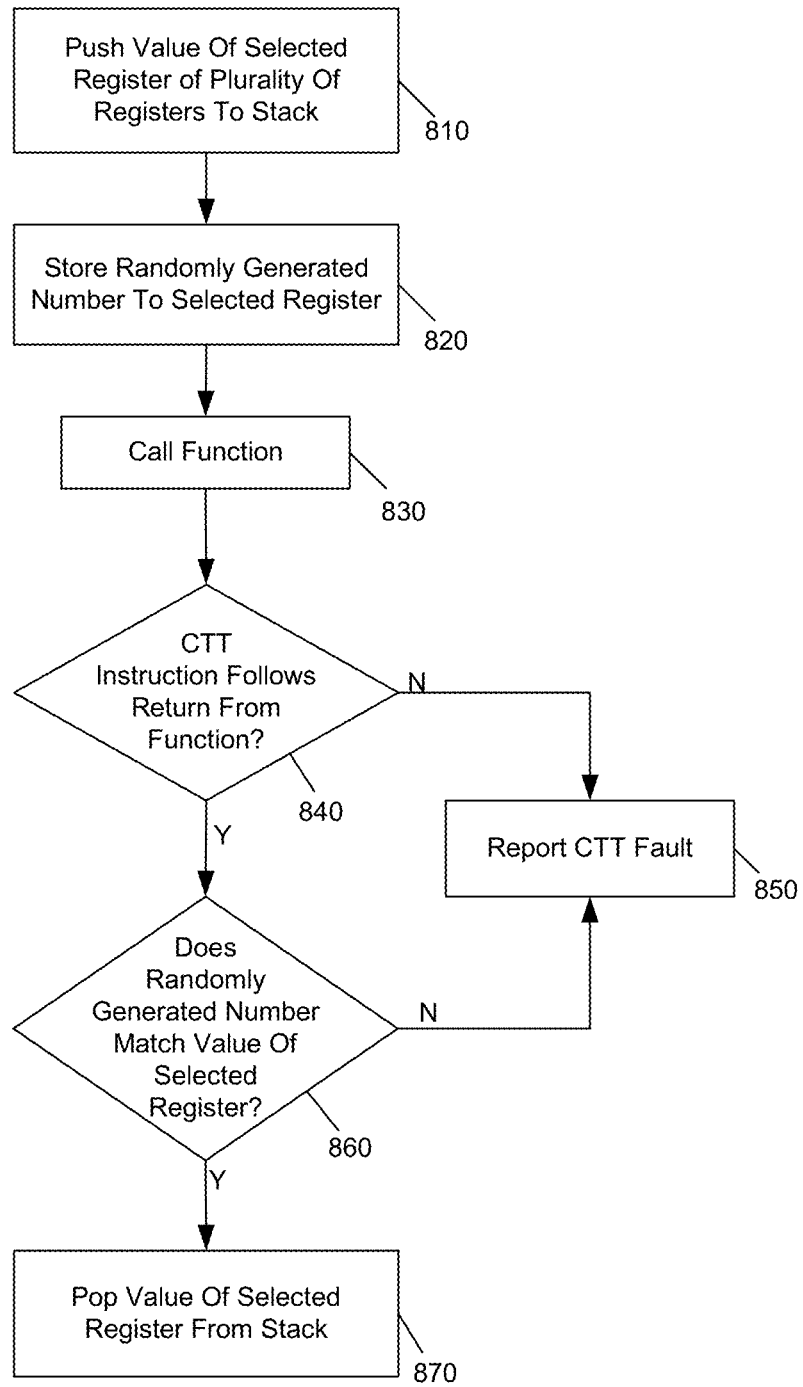
FIG. 9 is a flow diagram of a method for valid gadget protection in accordance with an embodiment.

Referring now to FIG. 9, shown is a flow diagram of a method for valid gadget protection in accordance with an embodiment. Method 800 of FIG. 9 may be performed by a collection of components including processor hardware (including CTT hardware), logic, firmware, and/or software during execution of a process or other collection of instructions during system operation. In general, the operations identified in FIG. 9 may be used to enable and use an interlock register technique to ensure that an attack such as a ROP-based attack does not occur within a valid gadget. Note that in some embodiments method 800 may be implemented by execution of code, either inserted by a programmer, a static compiler, a dynamic binary translation engine or a static binary translator invoked on the program.

As shown in FIG. 9, method 800 begins at block 810. There, a value of a selected register of multiple registers may be pushed to a stack. While this register may be any register of a register file, in some embodiments the register may be selected from a group of predetermined registers. As an example, the predetermined registers may include a base index (RBX) register, a destination index register (RDI), a source index (RSI) register, or any one of general purpose registers R12-R15. This push operation thus stores a given register value to a stack, where it can be later obtained from the stack (e.g., responsive to a pop operation) to be used during further execution of the process after the valid gadget protection technique has been performed.

Next at block 820, a randomly generated number may be stored to the selected register. In an embodiment, this randomly generated number may be a 4 or 8-byte random number determined, e.g., according to a pseudorandom number generator, by a dynamic loader or any other entity, and inserted as an immediate value encoded in the instruction that stores this number to the selected register.

With further reference to FIG. 9, next at block 830 a call to a function occurs. Accordingly, the given function may be executed through its various operations until it is ended via a RETURN instruction that returns control flow to the next instruction following the call function instruction (assuming a correct program control flow occurs to an end of the function).

After the return from the function, at diamond 840 it is determined whether a CTT instruction (namely an ENDRET instruction) is the first instruction encountered following the return from the function. If not, a CTT fault is reported to the OS (block 850). Note that this CTT-based monitoring and fault generation may be performed using the CTT state machine and exception logic as described above. Thus if a valid CTT instruction does not follow upon return from the function, a fault is raised, which may trigger a fault handler or interrupt service routine to execute to determine whether an attack or other malware effect has occurred.

Still referring to FIG. 9, instead if a function is validly terminated via a CTT instruction following the return from the function (as determined at diamond 840), control passes to diamond 860. There it can be determined whether the previously generated random number (e.g., as inserted by the dynamic loader as an immediate value encoded in the instruction that does this comparison) matches the value of the selected register. In an embodiment, a comparison logic of a processor may make this determination. Thus at diamond 860 it is determined whether the selected register still has the same value upon function return as it did when the function was called. If not, this indicates that the full function code was not executed (since the correct function operation will ensure that the selected register is maintained (or restored) with its calling value at the point of function return). If the match does not occur, control passes to block 850 where this condition is treated as if a CTT fault has occurred and the program is terminated, as discussed above.

Otherwise, when the randomly generated number matches the value of the selected register, it is ensured that correct function operation and appropriate control transfer occurred. Accordingly, control passes to block 870 where the original value from the selected register is popped from the stack and restored to the register. Thereafter, continued code execution within a process may continue. While shown at this high level in the embodiment of FIG. 9, the scope of the present invention is not limited in this regard.

As another defense, a software managed shadow stack may be used to protect against ROP-based attacks. Here, at an entry to a function, a program saves the return address stored on the stack to an alternate stack, which in an embodiment is a software managed stack, also referred to herein as a shadow stack. Prior to all exit points in the function (e.g., before returning from the function or making a call to another function), the return address on the stack is compared to the top entry of the shadow stack. A mismatch indicates an error or potential attack, responsive to which the program may be terminated (e.g., by crashing). If the comparison indicates a match, continued execution of the program occurs. Note that in this case, prior to returning from the function, the shadow stack is popped. With this shadow stack operation, an attacker needs to not just control the return addresses on the stack but also control the return addresses on the shadow stack, making the setup phase for exploit pre-conditions more difficult.

Figure 10:
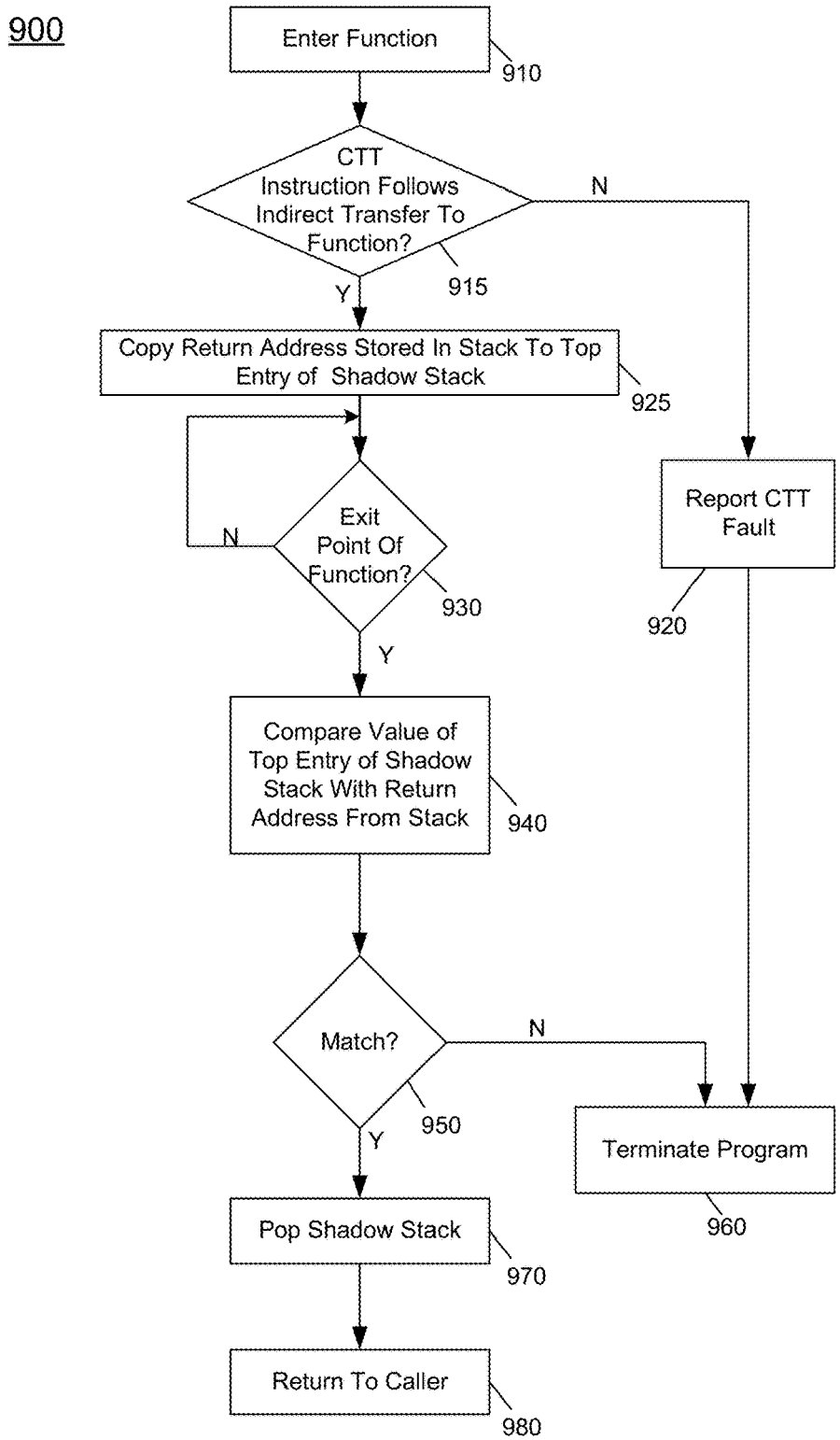
FIG. 10 is a flow diagram of a method for valid gadget protection in accordance with another embodiment.

Referring now to FIG. 10, shown is a flow diagram of a method for valid gadget protection in accordance with another embodiment. Method 900 of FIG. 10 may be performed by a collection of components including processor hardware (including CTT hardware), logic, firmware, and/or software during execution of a process or other collection of instructions during system operation. In general, method 900 may be used to provide value gadget defense using a software managed shadow stack. As shown in FIG. 10, method 900 begins by entering into execution of a function, e.g., responsive to a call instruction of a calling code segment (block 910). Next it is determined whether a CTT instruction follows an indirect control transfer instruction (e.g., CALL/JUMP) to this function (diamond 915). If not, a CTT fault is reported (block 920), and program execution may be terminated (block 960). Otherwise, next at block 925 a return address for this function (to cause a return to the next instruction of the calling code following the call instruction) that is stored in the stack may be copied to a top entry of a shadow stack. Although the scope of the present invention is not limited in this regard, understand that this shadow stack may be present in various locations such as ring-3 system memory or restricted ring-0 system memory. Additionally, the shadow stack memory may be restricted to be writable only for the code that updates the shadow stack memory (e.g., a VMM) or by special instructions used to write the shadow stack (e.g., an ENDBRANCH). In an embodiment, this shadow stack memory may be made to be read-writable only to specific trusted code that manages the shadow stack (e.g., the VMM). Control next passes to diamond 930 where it is determined whether an exit point of the function has been reached. This exit point may be at function end, or it may be any other exit point within the function (e.g., a call to another function). If an exit point is reached, control passes to block 940 where the top entry of the shadow stack may be compared with the return address obtained from the stack. Again, comparison logic of the processor may be used for this comparison. Next it is determined whether a result of the comparison is a match (diamond 950). If not, this indicates that malicious code or other malware has initiated an attack, as evidenced by these different values. Accordingly, program execution may terminate (block 960). For example, an exception may be raised, and an exception handler may cause the termination (e.g., via a general protection fault).

Otherwise, if a match is indicated, control passes to block 970 where the shadow stack may be popped (to thus remove this return address) and control returns to the caller (block 980), e.g., the next instruction of the calling code, which may be an appropriate CTT instruction such as an ENDRET instruction. While shown at this high level in the embodiment of FIG. 10, many variations and alternatives are possible.

A common attack technique used in ROP attacks is to atomically switch a stack pointer to an attacker controlled memory buffer, using an operation known as a stack pivot. Embodiments may provide a measure of defense against such attack by performing stack pivot checks. For this defense, prior to all exit points in the function (e.g., before returning from the function or making a call to another function), code (e.g., compiler emitted code) may be provided to check a stack pointer value against upper and lower bounds of the stack that have been established for this thread. If an attacker had managed to pivot the stack, this check may detect the pivot and signal an exception, leading to the program being terminated. Such bound checks may be efficiently implemented in hardware using instructions such as those provided by Intel® Memory Protection Extensions (MPX).

Figure 11:
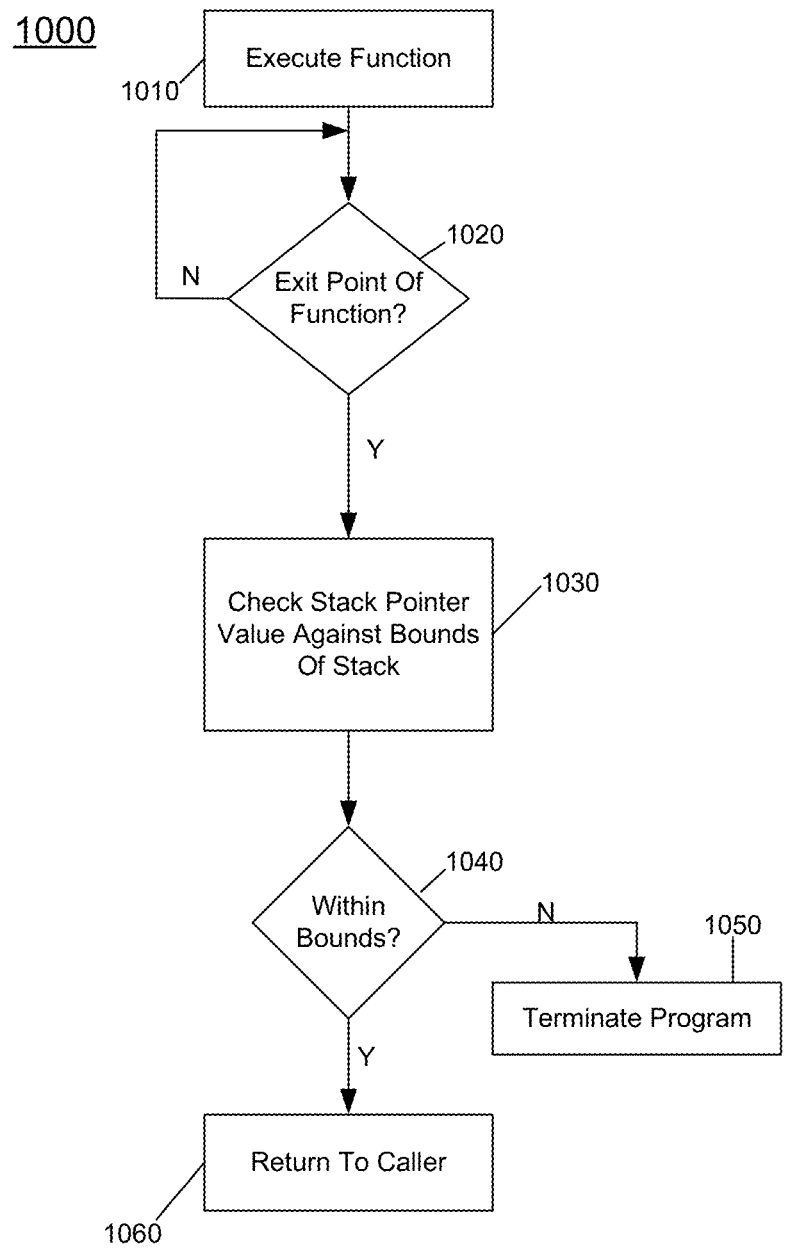
FIG. 11 is a flow diagram of a method for valid gadget protection in accordance with a still further embodiment.

Referring now to FIG. 11, shown is a flow diagram of a method for valid gadget protection in accordance with a still further embodiment. Method 1000 of FIG. 11 may be performed by a collection of components including processor hardware (including CTT hardware), logic, firmware, and/or software during execution of a process or other collection of instructions during system operation. In general, method 1000 may be used to provide valid gadget defense against a stack pivot attack. As illustrated in FIG. 11, method 1000 begins by executing a function (block 1010). Next it is determined during function execution whether an exit point of the function has been reached (diamond 1020). If so, control passes to block 1030 where a stack pointer value may be checked against the bounds of the stack.

While the scope of the present invention is not limited in this regard, in an embodiment checking of the stack pointer value against the stack bounds may be performed by execution of one or more user-level instructions such as upper and lower bounds limit check instructions. In one embodiment, a processor may be configured with a set of bounds registers. As one such example, a set of bounds registers may be configured, with each including multiple fields for lower and upper bounds of a given buffer or other memory structure. During processor operation, one or more of these bounds registers may be written with values of a given memory frame such as a stack buffer or other memory collection. As one example, a first bounds register may include a first field to store an address of the bottom of the stack and a second field to store an address of the top of the stack. Of course in other cases, separate bounds registers may be provided, each to store a given top or lower bound of a memory collection.

In one embodiment, multiple user-level instructions may be executed to determine whether a given address such as a return address is within the bounds of the stack. In one embodiment, a first such instruction is a lower bound check instruction (BNDCL) to ensure that the stack address is at least greater than this lower bound. Similarly, a second instruction is an upper bound check instruction (BNDCU) to ensure that the stack address is less than this upper bound. Next, responsive to this checking it is determined whether the stack pointer value is within the bounds (diamond 1040). If not, this indicates that malicious code or other malware has initiated a stack pivot-based attack. As such, control passes to block 1050, where program execution may terminate. For example, an exception may be raised, to be handled by an exception handler (e.g., responsive to a bounds protection fault). Otherwise, if the stack pointer is within the bounds, control returns to the caller (block 1060). That is so, as the appropriately bounded stack pointer indicates that a stack pivot-based attack likely did not occur. Understand while shown at this high level in the embodiment of FIG. 11, many variations and alternatives are possible.

Embodiments may thus be used in connection with CTT instructions and hardware to provide further measures to protect against invocation of valid gadgets in code. Using an embodiment, instruction execution can be prevented from being misaligned or control being transferred to non-programmer intended locations in programs. Note that one or more of the above techniques can be used in connection with CTT instructions to thus harden control flow integrity of the program.

Figure 12:
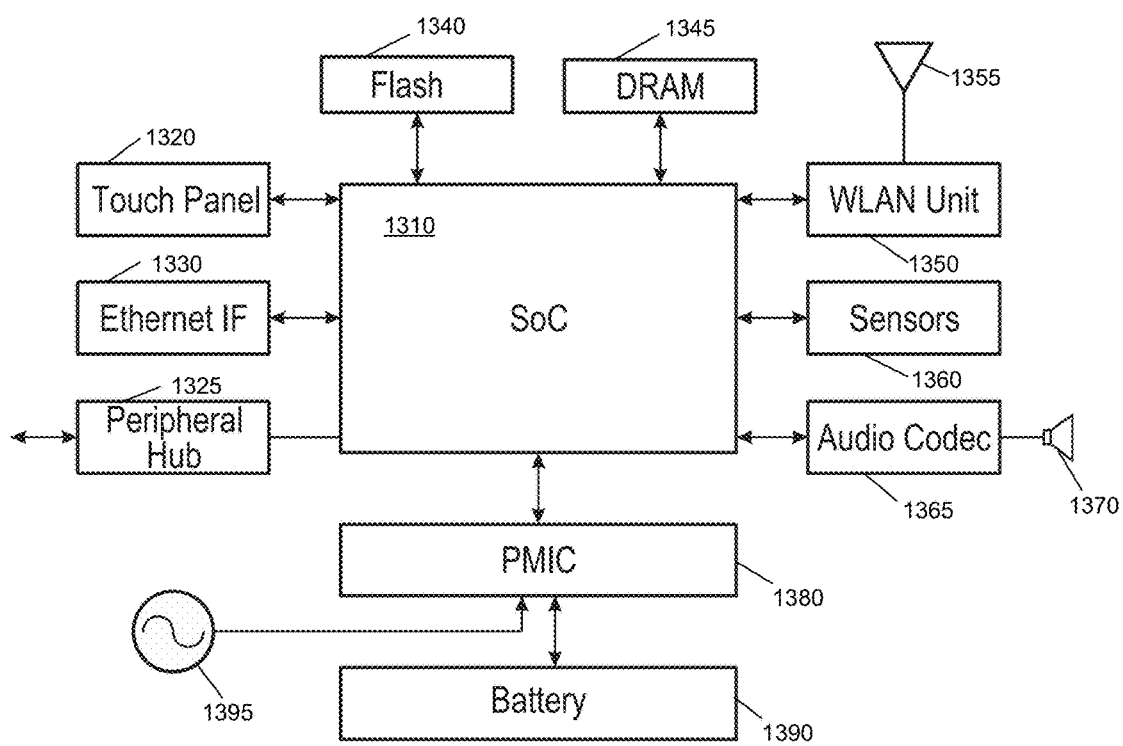
FIG. 12 is a block diagram of an example system with which embodiments may be used.

Referring now to FIG. 12, shown is a block diagram of an example system with which embodiments may be used. In the illustration of FIG. 12, system 1300 may be mobile low-power system such as a tablet computer, 2:1 tablet, phablet or other convertible or standalone tablet system. As illustrated, a SoC 1310 is present and may be configured to operate as an application processor for the device. SoC 1310 may include CTT hardware, software, and/or firmware as described herein to provide protection against ROP and other security attacks.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 12, to provide for wireless capabilities, a WLAN unit 1350 is coupled to SoC 1310 and in turn to an antenna 1355. In various implementations, WLAN unit 1350 may provide for communication according to one or more wireless protocols, including an IEEE 802.11 protocol, a Bluetooth™ protocol or any other wireless protocol.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 12, many variations and alternatives are possible.

Figure 13:
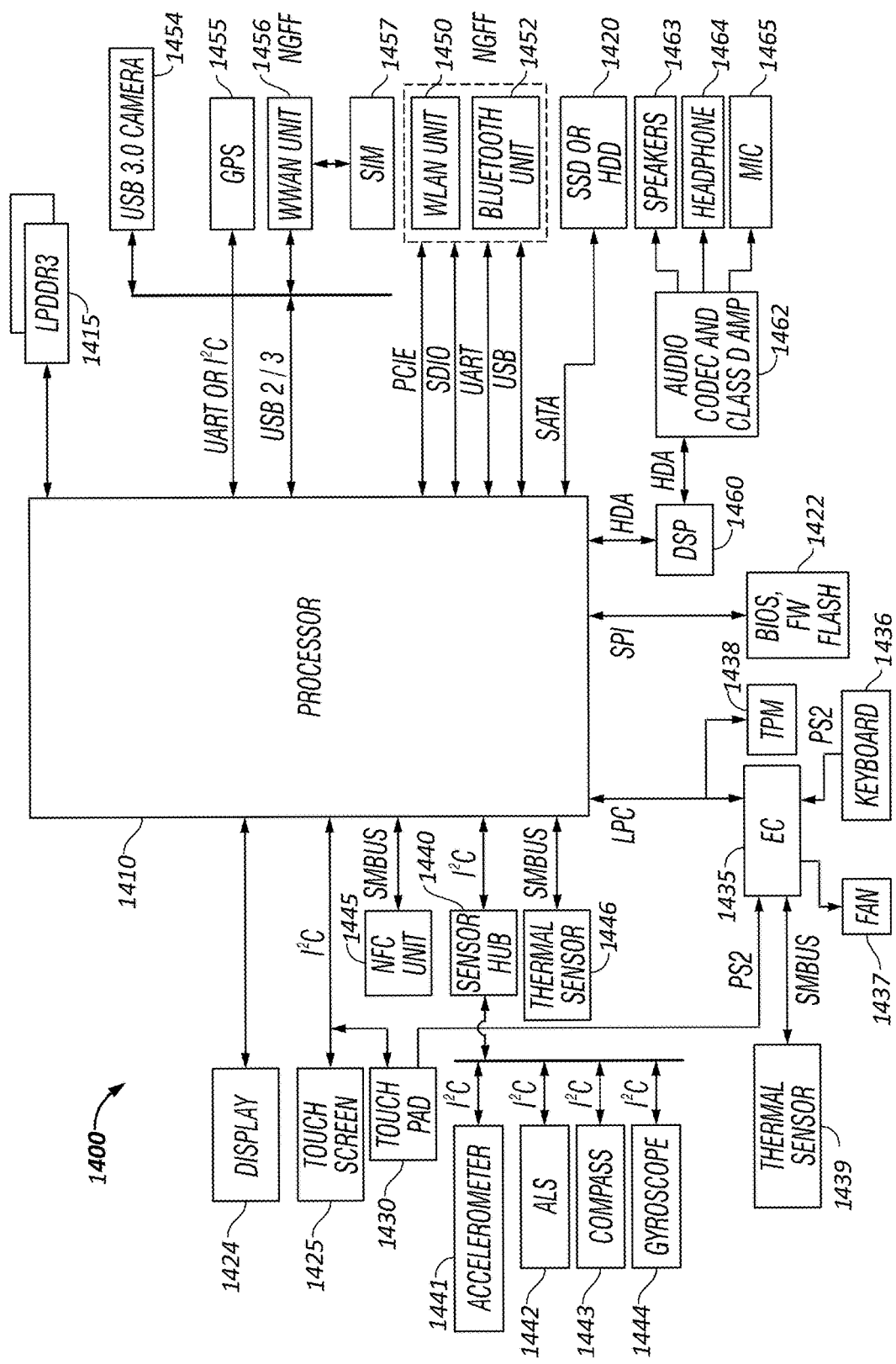
FIG. 13 is a block diagram of a representative computer system.

Referring now to FIG. 13, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1400 is implemented as a SoC. Processor 1400 may include CTT hardware, software, and/or firmware as described herein to provide protection against ROP and other security attacks.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 13, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 13 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I²C interconnect. As further shown in FIG. 13, in addition to touch screen 1425, user input by way of touch can also occur via a touch pad 1430 which may be configured within the chassis and may also be coupled to the same I²C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an I²C interconnect. In the embodiment shown in FIG. 13, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 13, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 in accordance with the Trusted Computing Group (TCG) TPM Specification Version 1.2, dated Oct. 2, 2003, may also couple to processor 1410 via this LPC interconnect.

System 1400 can communicate with external devices in a variety of manners, including wirelessly. In the embodiment shown in FIG. 13, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 13, additional wireless units can include other short range wireless engines including a WLAN unit 1450 and a Bluetooth unit 1452. Using WLAN unit 1450, Wi-Fi™ communications in accordance with a given IEEE 802.11 standard can be realized, while via Bluetooth unit 1452, short range communications via a Bluetooth protocol can occur. These units may communicate with processor 1410 via, e.g., a USB link or a universal asynchronous receiver transmitter (UART) link. Or these units may couple to processor 1410 via an interconnect according to a PCIe™ protocol or another such protocol such as a serial data input/output (SDIO) standard.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 13, WWAN unit 1456 and an integrated capture device such as a camera module 1454 may communicate via a given USB protocol such as a USB 2.0 or 3.0 link, or a UART or I²C protocol.

An integrated camera module 1454 can be incorporated in the lid. To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 13, understand the scope of the present invention is not limited in this regard.

Figure 14:
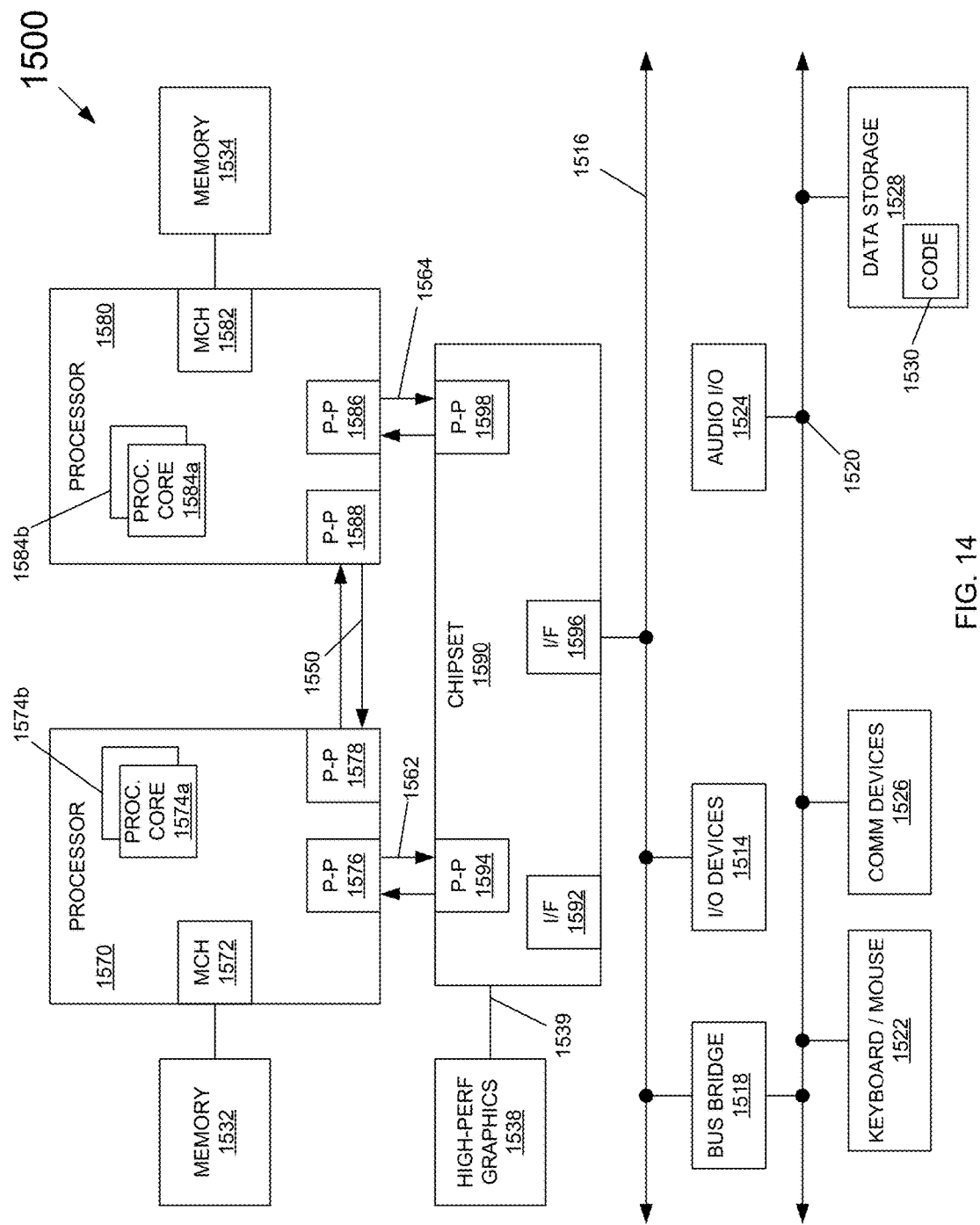
FIG. 14 is a block diagram of a system in accordance with an embodiment of the present invention.

Embodiments may be implemented in many different system types. Referring now to FIG. 14, shown is a block diagram of a system in accordance with an embodiment of the present invention. As shown in FIG. 14, multiprocessor system 1500 is a point-to-point interconnect system, and includes a first processor 1570 and a second processor 1580 coupled via a point-to-point interconnect 1550. As shown in FIG. 14, each of processors 1570 and 1580 may be multicore processors, including first and second processor cores (i.e., processor cores 1574a and 1574b and processor cores 1584a and 1584b), although potentially many more cores may be present in the processors. Each of the processors can include CTT hardware and logic to perform the security techniques described herein.

Still referring to FIG. 14, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 14, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 14, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 14, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

The following Examples pertain to further embodiments.

In Example 1, a processor comprises: a first register to store a first bound value for a stack to be stored in a memory; a second register to store a second bound value for the stack; a checker logic to determine, prior to an exit point at a conclusion of a function to be executed on the processor, whether a value of a stack pointer is within a range between the first bound value and the second bound value; and a logic to prevent a return to a caller of the function if the stack pointer value is not within the range.

In Example 2, the logic of Example 1 is to raise an exception if the stack pointer value is not within the range.

In Example 3, the exception is to indicate a stack pivot attack.

In Example 4, the processor of Examples 2 or 3 further comprises control logic to terminate the program responsive to the exception.

In Example 5, the checker logic of one of the above Examples is further to determine, prior to a second exit point of the function, whether the value of the stack pointer is within the range.

In Example 6, the first register and the second register comprise a single register.

In Example 7, the checker logic of one of the above Examples optionally is to execute at least one user level instruction to determine whether the value of the stack pointer is within the range.

In Example 8, the processor of one of the above Examples further comprises a second logic to store a random value in a third register prior to a call to the function, and responsive to a CTT instruction encountered after a control transfer operation that returns from the function, determine whether a current value of the third register equals the random value, and if so, continue execution of a caller of the function, and otherwise to terminate execution.

In Example 9, at least one computer readable medium includes instructions that when executed enable a system to: during execution of a process on a processor of the system and prior to a call to a function, store a first value in a first register of a plurality of registers of the processor; responsive to a CTT instruction encountered after a control transfer operation that returns from the function, determine whether a current value of the first register equals the first value; and if so, continue execution of the process, and otherwise raise a violation.

In Example 10, the at least one computer readable medium of Example 9 further comprises instructions that when executed enable the system to, during execution of the function, store the first value of the first register to a storage, use the first register to store a first function value and, prior to a termination of the function, to restore the first value from the storage to the first register, the first value comprising a random value.

In Example 11, the violation is to indicate presence of a malware attack in which the function is at least one of improperly entered or improperly exited.

In Example 12, the at least one computer readable medium of Example 9 further comprises instructions that when executed enable the system, responsive to the violation, to perform one or more of termination the process, shutdown of the system, and shutdown of a guest that caused the violation.

In Example 13, the processor comprises an interlock register, the interlock register corresponding to the first register.

In Example 14, raising the violation comprises insertion of a CTT fault micro-operation into a pipeline of the processor.

In Example 15, the at least one computer readable medium of one of the above Examples optionally further comprises instructions that when executed enable the system to save a value of the first register to a stack before the call to the function.

In Example 16, the at least one computer readable medium of Example 15 optionally further comprises instructions that when executed enable the system to restore the value of the first register from the stack to the first register upon the continued process execution.

In Example 17, the at least one computer readable medium of one of the above Examples optionally further comprises instructions that when executed enable the system to set a page to an execute only status, the page including the instructions to store the random value in the first register via immediate parameters.

In Example 18, the at least one computer readable medium of Example 17 further comprises instructions that when executed enable the system to update an extended page table entry associated with the page to the execute only status, where an entry associated with the page in a first page table is set to a read execute status.

In Example 19, a method comprises: associated with a control transfer termination instruction, copying a return address of a function executed on a processor of a system and called during execution of a program to a top entry of a shadow stack of a memory, the return address further stored in a stack of the memory; at a conclusion of the function, comparing the return address stored in the stack to a value stored in the top entry of the shadow stack; and if the return address stored in the stack matches the value stored in the top entry of the shadow stack, returning to a caller of the function, and otherwise terminating the program.

In Example 20, the method of Example 19 optionally further comprises copying the return address to the top entry of the shadow stack at an entry point to the function.

In Example 21, the method of Example 19 optionally further comprises removing the value stored in the top entry from the shadow stack at the conclusion of the function.

In Example 22, the shadow stack comprises a software managed stack.

In Example 23, the method of Example 22 optionally further comprises maintaining the shadow stack in one or more pages of a memory, the one or more pages having a non-read-writable status and only accessible to a trusted code agent that manages the software managed stack.

In Example 24, a machine-readable storage medium includes machine-readable instructions, when executed, to implement a method of any of the above Examples.

In Example 25, an apparatus comprises: means for copying a return address of a function executed on a processor of a system and called during execution of a program to a top entry of a shadow stack of a memory, the return address further stored in a stack of the memory; means for, at a conclusion of the function, comparing the return address stored in the stack to a value stored in the top entry of the shadow stack; means for, if the return address stored in the stack matches the value stored in the top entry of the shadow stack, returning to a caller of the function; and means for terminating the program if the return address stored in the stack does not match the value stored in the top entry of the shadow stack.

In Example 26, the apparatus of Example 25 further comprises means for copying the return address to the top entry of the shadow stack at an entry point to the function.

In Example 27, the apparatus of Example 25 further comprises means for removing the value stored in the top entry from the shadow stack at the conclusion of the function.

In Example 28, the shadow stack comprises a software managed stack.

In Example 29, the apparatus of Example 28 further comprises means for maintaining the shadow stack in one or more pages of a memory, the one or more pages having a read-writable status and only accessible to a trusted code agent that manages the software managed stack.

Understand also that various combinations of the above Examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory computer readable medium including instructions that when executed enable a system to:
   during execution of a process on a processor of the system and prior to a call to a function, store a first value in a first register of a plurality of registers of the processor, the first value comprising a random value;
   responsive to a control transfer termination (CTT) instruction encountered after a control transfer operation that returns from the function, determine whether a current value of the first register equals the first value;
   if so, continue execution of the process, and otherwise raise a violation; and
   set a page to an execute only status, the page including the instructions to store the random value in the first register via immediate parameters.

2. The at least one non-transitory computer readable medium of claim 1, further comprising instructions that when executed enable the system to, during execution of the function, store the first value of the first register to a storage, use the first register to store a first function value and, prior to a termination of the function, to restore the first value from the storage to the first register.

3. The at least one non-transitory computer readable medium of claim 1, wherein to raise the violation comprises a fault to indicate presence of a malware attack in which the function is at least one of improperly entered or improperly exited.

4. The at least one non-transitory computer readable medium of claim 1, further comprising instructions that when executed enable the system, responsive to the violation, to perform one or more of termination of the process, shutdown of the system, and shutdown of a guest that caused the violation.

5. The at least one non-transitory computer readable medium of claim 1, wherein the processor comprises an interlock register, the interlock register corresponding to the first register.

6. The at least one non-transitory computer readable medium of claim 1, wherein to raise the violation comprises insertion of a CTT fault micro-operation into a pipeline of the processor.

7. The at least one non-transitory computer readable medium of claim 1, further comprising instructions that when executed enable the system to save a value of the first register to a stack before the call to the function.

8. The at least one non-transitory computer readable medium of claim 7, further comprising instructions that when executed enable the system to restore the value of the first register from the stack to the first register upon the continued process execution.

9. The at least one non-transitory computer readable medium of claim 1, further comprising instructions that when executed enable the system to update an extended page table entry associated with the page to the execute only status, wherein an entry associated with the page in a first page table is set to a read execute status.

10. An apparatus comprising:
    a decode circuit to decode instructions;
    an execution circuit to execute at least some of the decoded instructions;
    a hardware stack to store return addresses;
    a plurality of registers; and
    wherein the execution circuit is to:
      during execution of a process and prior to a call to a function, store a first value in a first register of the plurality of registers, the first value comprising a random value;
      responsive to a control transfer termination (CTT) instruction encountered after a control transfer operation that returns from the function, determine whether a current value of the first register equals the first value;
      if so, continue execution of the process, and otherwise raise a violation, and
      set a page to an execute only status, the page including at least one instruction to store the random value in the first register via immediate parameters.

11. The apparatus of claim 10, wherein the execution circuit comprises a pseudorandom number generator to generate the random value.

12. The apparatus of claim 10, wherein the first register comprises an interlock register.

13. The apparatus of claim 10, wherein the execution circuit comprises a comparison logic to compare the current value and the first value.

14. The apparatus of claim 10, wherein the execution circuit, during execution of the function, is to obtain the first value from the hardware stack and restore the first value to the first register.

15. A method comprising:
    during execution of a process on a processor of a system and prior to a call to a function, storing a first value in a first register of a plurality of registers of the processor, the first value comprising a random value;
    responsive to a control transfer termination (CTT) instruction encountered after a control transfer operation that returns from the function, determining whether a current value of the first register equals the first value;
    if so, continuing execution of the process, and otherwise raising a violation; and
    setting a page to an execute only status, the page including at least one instruction to store the random value in the first register via immediate parameters.

16. The method of claim 15, wherein raising the violation comprises inserting a CTT fault micro-operation into a pipeline of the processor.

17. The method of claim 15, further comprising updating an extended page table entry associated with the page to the execute only status, wherein an entry associated with the page in a first page table is set to a read execute status.

* * * * *